US011227185B2

(12) United States Patent
Lin et al.

(10) Patent No.: US 11,227,185 B2
(45) Date of Patent: Jan. 18, 2022

(54) IDENTIFYING VISUALLY SIMILAR DIGITAL IMAGES UTILIZING DEEP LEARNING

(71) Applicant: ADOBE INC., San Jose, CA (US)

(72) Inventors: Zhe Lin, Fremont, CA (US); Xiaohui Shen, San Jose, CA (US); Mingyang Ling, San Francisco, CA (US); Jianming Zhang, Campbell, CA (US); Jason Kuen, Singapore (SG); Brett Butterfield, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 60 days.

(21) Appl. No.: 16/817,234

(22) Filed: Mar. 12, 2020

(65) Prior Publication Data

US 2020/0210763 A1    Jul. 2, 2020

Related U.S. Application Data

(63) Continuation of application No. 15/983,949, filed on May 18, 2018, now Pat. No. 10,628,708.

(51) Int. Cl.
*G06K 9/62* (2006.01)
*G06T 7/73* (2017.01)
*G06K 9/52* (2006.01)

(52) U.S. Cl.
CPC ............ *G06K 9/6254* (2013.01); *G06K 9/52* (2013.01); *G06K 9/6257* (2013.01); *G06T 7/75* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| 8,165,407 | B1 | 4/2012 | Khosla et al. |
| 2010/0111396 | A1 | 5/2010 | Boucheron |
| 2014/0108016 | A1 | 4/2014 | Albrecht |
| 2017/0097948 | A1 | 4/2017 | Kerr et al. |
| 2017/0262479 | A1 | 9/2017 | Chester et al. |

OTHER PUBLICATIONS

Examination Report as received in United Kingdom Application GB1901759.9 dated Feb. 16, 2021.
(Continued)

*Primary Examiner* — Delomia L Gilliard
(74) *Attorney, Agent, or Firm* — Keller Jolley Preece

(57) ABSTRACT

The present disclosure relates to systems, methods, and non-transitory computer readable media for utilizing a deep neural network-based model to identify similar digital images for query digital images. For example, the disclosed systems utilize a deep neural network-based model to analyze query digital images to generate deep neural network-based representations of the query digital images. In addition, the disclosed systems can generate results of visually-similar digital images for the query digital images based on comparing the deep neural network-based representations with representations of candidate digital images. Furthermore, the disclosed systems can identify visually similar digital images based on user-defined attributes and image masks to emphasize specific attributes or portions of query digital images.

20 Claims, 13 Drawing Sheets

(56) References Cited

OTHER PUBLICATIONS

Examination Report as received in United Kingdom Application GB1901759.9 dated Sep. 28, 2020.
Artem Babenko, Anton Slesarev, Alexandr Chigorin, Victor Lempitsky. Neural Codes for Image Retrieval, In *Proceedings of the IEEE Conference on Computer Vision and Pattern Recognition 2014*. 13861393.
Tiezheng Ge, Kaiming He, Qifa Ke, and Jian Sun. 2013. Optimized product quantization for approximate nearest neighbor search. In *Proceedings of the IEEE Conference on Computer Vision and Pattern Recognition*. 2946-2953.
Kaiming He, Xiangyu Zhang, Shaoqing Ren, and Jian Sun. 2014. Spatial pyramid pooling in deep convolutional networks for visual recognition. In *European Conference on Computer Vision*. Springer, 346-361.
Jiang Wang, Yang Song, Thomas Leung, Chuck Rosenberg, Jingbin Wang, James Philbin, Bo Chen, and Ying Wu. 2014. Learning fine-grained image similarity with deep ranking. In *Proceedings of the IEEE Conference on Computer Vision and Pattern Recognition*. 1386-1393.
Jianming Zhang, Shugao Ma, Mehrnoosh Sameki, Stan Sclaroff, Margrit Betke, Zhe Lin, Xiaohui Shen, Brian Price, and Radomir Meeh. 2015. Salient object subitizing. In *Proceedings of the IEEE Conference on Computer Vision and Pattern Recognition*. 4045-4054.
Combined Search and Examination Report as received in United Kingdom Application GB1901759.9 dated Jul. 23, 2019.
U.S. Appl. No. 15/983,949, Oct. 28, 2019, Preinterview 1st Office Action.
U.S. Appl. No. 15/983,949, Dec. 11, 2019, Notice of Allowance.
Intention to Grant as received in United Kingdom Application GB1901759.9 dated Jul. 28, 2021.

IDENTIFYING VISUALLY SIMILAR DIGITAL IMAGES UTILIZING DEEP LEARNING

CROSS-REFERENCE TO RELATED APPLICATIONS

The present application is a continuation of U.S. application Ser. No. 15/983,949, filed on May 18, 2018. The aforementioned application is hereby incorporated by reference in its entirety.

BACKGROUND

Advancements in computing devices and image analysis techniques have led to a variety of innovations in identifying digital images that are visually similar. For example, image analysis systems are now able to analyze high-resolution digital images to identify objects within the images and search through terabytes of information stored in digital image databases to identify other digital images that depict the same or similar objects.

Despite these advances however, conventional image analysis systems continue to suffer from a number of disadvantages, particularly in the accuracy and flexibility of identifying similar digital images. For instance, while conventional image analysis systems can identify the same objects in two different digital images, these systems often disregard other aspects of the images (e.g., backgrounds, spatial arrangement of objects, and other visual attributes of the images). Indeed, because conventional image analysis systems often rely solely on semantic content to classify images based on various image tags, these systems are too object-focused in their analysis. As a result, conventional image analysis systems often produce inaccurate results when determining the visual similarity of two images. This is a particularly significant problem because, due to this inaccuracy, users of conventional image analysis systems are often required to spend an inordinate amount of time performing excessive user actions searching through match results before locating desirable image matches.

In addition, conventional image analysis systems are often inflexible. Indeed, as mentioned, conventional image analysis systems are often one-dimensional in that they only match digital images based on identifying particular objects within the images. Many of these systems also require very specific input (e.g., a single digital image) to use as basis for finding matching images. In cases where a user wants to find similar images for more than one input image, many conventional image analysis systems require performing multiple single-image searches and/or retraining an analysis model to accommodate multiple input images. As a result of their inflexible nature, these conventional systems are often incapable of tailoring image matching to the needs of a user beyond searching individual images for particular objects.

Thus, there are several disadvantages with regard to conventional image analysis systems.

SUMMARY

Embodiments described herein provide benefits and solve one or more of the foregoing or other problems in the art by providing systems, methods, and non-transitory computer readable media that utilize a deep neural network-based model to accurately and flexibly identify digital images that share visual attributes. For instance, the disclosed systems can match digital images based at least on visual attributes such as spatial selectivity, image composition, and/or object count. In addition, the disclosed systems can identify digital image matches based on a composite analysis of visual attributes from multiple digital images. While this summary refers to systems for simplicity, the features summarized herein are also attributable to the various methods and non-transitory computer readable media of this disclosure.

To illustrate, in some embodiments, the disclosed systems receive a user selection of a query digital image and at least one of spatial selectivity, image composition, and/or object count to use to identify visually similar digital images. The systems further utilize a trained deep neural network-based model to generate a deep neural network-based representation of the query digital image. Based on the deep neural network-based representation of the query digital image, the disclosed systems identify similar digital images for the query digital image from a digital image database.

In some embodiments, the disclosed systems receive a multi-image query identifying multiple query images and then identifies digital images that are similar to the combined visual attributes of the multiple query images. In some embodiments, the disclosed systems facilitate multi-query similarity by generating a compound feature vector that represents visual attributes of the multiple query images. The disclosed systems utilize the trained deep neural network-based model to identify similar digital images based on the compound feature vector.

The disclosed systems, methods, and non-transitory computer-readable media provide several advantages over conventional image analysis systems. For example, the disclosed systems are able to determine image similarity based on multiple visual attributes such as spatial selectivity, image composition/layout, and object count. As a result, the disclosed systems identify images that are more visually similar to a query digital image. Furthermore, because the disclosed systems are capable of receiving indications of visual attributes for one or more query digital images, the disclosed systems can flexibly identify matching digital images based on a variety of user-selected factors (e.g., multiple query digital images and various visual attributes).

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
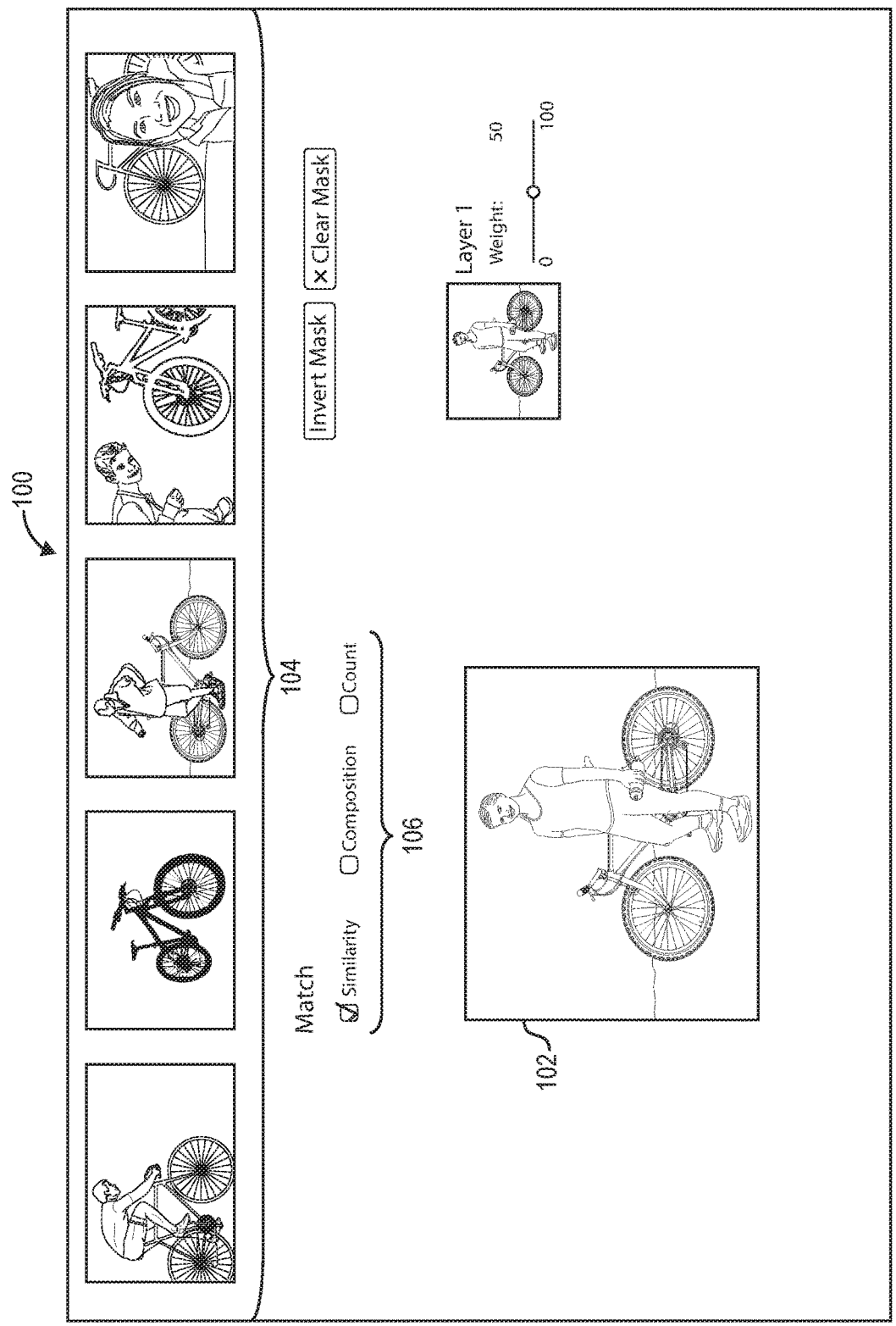
FIG. 1 illustrates a user interface including a query digital image in accordance with one or more embodiments.

One or more embodiments described herein provide benefits and solve one or more of the foregoing or other problems in the art by providing a digital image matching system that utilizes a deep neural network-based model to accurately and flexibly identify digital images that share visual attributes. For instance, the digital image matching system can match digital images based on spatial selectivity, image composition, and/or object count. In addition, the digital image matching system can identify similar digital image based on a composite analysis of visual attributes from multiple query images.

To illustrate, in some embodiments, the digital image matching system receives a query digital image in addition to a user selection of at least one of spatial selectivity, image composition, and/or object count of the query digital image to use to identify visually similar digital images. The digital image matching system further utilizes a trained deep neural network-based model to generate a deep neural network-based representation (e.g., a feature vector) of the query digital image. The digital image matching system can further determine similarity scores for a plurality of candidate digital images stored within a digital image database by comparing features (e.g., the deep neural network-based representation) of the query digital image with features of the stored digital images. Based on the similarity scores, the digital image matching system identifies similar digital images for the query digital image from a digital image database.

In some embodiments, the digital image matching system receives more than one query digital image, each including an indication of visual attributes to use to identify digital images that share the indicated attributes. In these embodiments, the digital image matching system generates a multi-query vector representation that represents features of each query digital image. Based on the multi-query vector representation, the digital image matching system identifies similar digital images from a digital image database.

To generate a deep neural network-based representation for a digital image, in some embodiments the digital image matching system trains a deep neural network-based model to predict features for training digital images and compare the predicted features with actual (e.g., ground truth) features. Indeed, the digital image matching system utilizes a set of training data, such as a plurality of training images and corresponding ground truth feature vectors, to train the deep neural network-based model to correctly predict feature vectors for digital images.

In some embodiments, as part of generating features to compare between a query digital image and stored candidate digital images, the digital image matching system can utilize a neural network (e.g., the deep neural network-based model) trained to predict scores for a number of tags that cover a diverse range of textual concepts (e.g., car, person, tree, sun, etc.) for objects that could be depicted in an image. The digital image matching system utilizes a set of training data, such as a plurality of training images and corresponding training tags, to train the deep neural network-based model to correctly predict the scores for various tags. In some embodiments, the digital image matching system can predict scores for a set of image tags associated with the deep neural network-based model. Indeed, the trained deep neural network-based model can predict or determine scores for each image tag (e.g., car, person, tree, sun, etc.) for the query digital image to determine, for each image tag, a probability that the query digital image contains or depicts an object corresponding to the given image tag.

As mentioned, the digital image matching system receives a query digital image. In particular, the digital image matching system receives a query digital image from a user client device. Additionally, in some embodiments the digital image matching system receives, in conjunction with the query digital image, a user selection of visual attributes to use to identify visually similar digital images. For example, the digital image matching system receives a user selection of one or more of spatial selectivity, image composition, and/or object count. Additionally or alternatively, the digital image matching system receives a user selection of a query digital image received from another source and/or stored within a digital image database associated with the digital image matching system.

As a baseline, the digital image matching system utilizes a deep neural network-based model to generate feature maps for a query digital image. Based on the generated feature maps, the digital image matching system further utilizes one or more of a spatial selectivity algorithm, an image composition algorithm, and/or an object count algorithm to generate a deep neural network-based representation of the query digital image. To illustrate, in response to receiving the query digital image in conjunction with any user selection of visual attributes to use as a basis for identifying similar digital images, the digital image matching system can extract feature maps for the query digital image and, by using one or more of a spatial selectivity algorithm, an image composition algorithm, and/or an object count algorithm, can generate a set or sequence of deep features from the feature maps that represents the query digital image.

As mentioned, the digital image matching system analyzes a query digital image based on the selected visual attributes (e.g., semantic content, spatial selectivity, image composition, and/or object count) of the query digital image. For example, to generate the deep neural network-based representation of the query digital image, the digital image matching system can utilize a spatial selectivity algorithm based on receiving a user selection to match digital images according to spatial selectively. Similarly, the digital image matching system can utilize an image composition algorithm based on receiving a user selection to match digital images according to image composition. Additionally or alternatively, the digital image matching system can use an object count algorithm based on receiving a user selection to match digital images according to object counts. In some embodiments, the digital image matching system can utilize a hybrid or composite algorithm to match digital images based on two or more of spatial selectivity, image composition, and object count.

In addition to, or as part of, generating the deep neural network-based representation, the digital image matching system can apply weights to certain indicated areas or portions of the query digital image. Indeed, the digital image matching system can receive an image mask that highlights, outlines or otherwise defines one or more portions of the query digital image, and the digital image matching system can accordingly modify the deep neural network-based representation to apply a weight to the areas indicated by the image mask so that the features corresponding to the identified portion of the image have more of an impact on matching with features of stored digital images. By modifying the deep neural network-based representation to apply weights to masked areas/portions, the digital image matching system can emphasize user-indicated portions of the query digital image to identify digital images that more closely resemble the masked portions of the query digital image.

As mentioned, in some embodiments the digital image matching system receives more than one query digital image. In these embodiments, the digital image matching system generates a multi-query vector representation that represents visual attributes of one or more received query digital images. For instance, the digital image matching system utilizes the trained deep neural network-based model to generate a compound feature vector. Additionally, the digital image matching system identifies similar digital images by identifying digital images that have features that are the same or similar to those of the compound feature vector.

In multi-query scenarios where the digital image matching system receives two or more query digital images to consider together in identifying similar digital images, the digital image matching system can further receive a user selection of visual attributes (e.g., spatial selectivity, image composition, and/or object count). Accordingly, the digital image matching system can generate or modify the multi-query vector representation of the constituent digital images based on receiving a user selection of visual attributes to use to identify similar digital images. For example, the digital image matching system can modify the multi-query vector representation utilizing one or more of the spatial selectivity algorithm, the image composition algorithm, and/or the object count algorithm.

Additionally, the digital image matching system can further generate or modify the multi-query vector representation based on receiving image masks for the multiple query digital images associated with compound feature vector. Thus, as mentioned above in relation to a single query digital image, the digital image matching system can more heavily weight or emphasize those portions of the query digital images that are indicated by the image masks in identifying similar digital images.

Furthermore, the digital image matching system can identify, from a digital image database, similar digital images for a query digital image. In particular, the digital image matching system can determine similarity scores for a plurality of digital images within a digital image database. For example, the digital image matching system can determine similarity scores by comparing features (e.g., features within the deep neural network-based representation) of a query digital image with features of candidate digital images. In some embodiments, the digital image matching system can compare image tag probabilities for each of the plurality of digital images with the image tag probabilities for the query digital image (or the compound feature vector). In addition, the digital image matching system can rank the plurality of digital images based on the respective similarity scores. Accordingly, to identify a similar (e.g., matching) digital image, the digital image matching system can provide a number of top-ranked digital images or else can identify digital images that satisfy a particular similarity threshold.

The digital image matching system provides several advantages over conventional image analysis systems. For example, the digital image matching system improves accuracy and effectiveness over conventional image analysis systems. To illustrate, because the digital image matching system utilizes multiple visual attributes and/or multiple digital images to identify matching digital images, the digital image matching system identifies visually similar images more accurately than some conventional image analysis systems that rely solely on semantic content analysis and that utilize only single digital images as queries.

As a result of the improved accuracy of the digital image matching system, the digital image matching system further increases the speed and reduces the number of actions required for users to identify desirable image matches. For example, whereas users of conventional image analysis systems may spend an inordinate amount of time performing numerous scrolling and/or other navigation operations, users associated with the disclosed digital image matching system, on the other hand, perform fewer actions and spend less time because the digital image matching system produces and provides better image matches.

In addition, the digital image matching system also improves flexibility. For instance, whereas some conventional image analysis systems rely solely on semantic visual attributes to identify objects within images, the digital image matching system accommodates more tailored image matching. Indeed, the digital image matching system can identify matching digital images based on semantic visual attributes in addition to other visual attributes such as spatial selectivity, image composition, and object count. In some embodiments, the digital image matching system can receive (e.g., from a user client device) an indication of which visual attributes (of one or more query digital images) to use as a basis for identifying matching digital images, thereby allowing users to customize how the digital image matching system identifies matches. The digital image matching system further provides more flexible matching by enabling a user to define image masks to emphasize portions of one or more query digital images to match with other digital images.

The digital image matching system further performs faster than many conventional image analysis systems. In particular, whereas some conventional systems require retraining a model each time a user wants to match digital images based on a different visual attribute, the disclosed digital image matching system utilizes a deep neural network-based model that does not require such repeated retraining. Rather, the digital image matching system generates deep neural network-based representations that account for multiple visual attributes simultaneously, thereby saving processing time and computing power that might otherwise be used in repeatedly training a model. Furthermore, the digital image matching system implements a multi-query technique that enables the digital image matching system to analyze multiple digital images in tandem to identify digital images that are similar to an amalgamation of the features of the multiple images. Accordingly, the digital image matching system is computationally faster and more efficient than conventional systems that, given multiple query digital images, require multiple single-query analyses and a comparison of the results of each analysis to identify digital images that are similar to each query digital image.

As illustrated by the foregoing discussion, the present disclosure utilizes a variety of terms to describe features and benefits of the digital image matching system. Hereafter, additional detail is provided regarding the meaning of these terms as used in this disclosure. For example, as used herein, the term "query digital image" refers to a digital image that the digital image matching system uses as a basis for finding similar digital images. A query digital image can refer to a digital image that a user uses as a search query to find visually similar digital images. Indeed, a query digital image can refer to a digital image that a user provides and that the digital image matching system receives from a user client device. For example, a query digital image can refer to a digital image that the digital image matching system analyzes utilizing a deep neural network-based model to generate a deep neural network-based representation. Indeed, in some embodiments the digital image matching system extracts the deep neural network-based representation of the query digital image in the form of a feature vector.

As mentioned, the digital image matching system analyzes and classifies a query digital image to identify similar digital images. As used herein, the term "similar digital image" refers to a digital image that is similar (e.g., similar in appearance and/or in terms of unobservable deep features) to a query digital image. In particular, a similar digital image can refer to a digital image that shares visual attributes with a query digital image. For example, the digital image matching system can identify (e.g., match) a similar digital image as a digital image that has a similarity score that satisfies a similarity threshold. A similar digital image can correspond to a set of deep features that the digital image matching system identifies as similar to a deep neural network-based representation of a query digital image.

As mentioned, the digital image matching system receives user input to set or determine visual attributes to use as a basis for identifying similar digital images. As used herein, the term "visual attribute" refers to an attribute or trait of a digital image that is visible to an observer. Visual attributes can refer to attributes that the digital image matching system determines or identifies by analyzing a digital image (e.g., by way of a deep neural network-based model or otherwise). For example, visual attributes can refer to one or more of semantic content, spatial selectivity, image composition, and/or object count. Although visual attributes correspond to observable traits of an image, visual attributes can be represented or defined by unobservable traits of the image such as deep features.

As used herein, the term "semantic content" refers to a type of visual attribute of digital images. In particular, semantic content can refer to image tags that describe various attributes of a digital image such as objects contained or depicted in digital images. To illustrate, the digital image matching system can utilize a convolutional neural network trained on large-scale image classification datasets (e.g., ImageNet) to determine semantic content by predicting scores for a set of image tags—i.e., by determining probabilities that a given digital image depicts objects described by the image tags.

As used herein, the term "image tag" refers to a text-based descriptor of a digital image. In particular, an image tag can refer to a string of text that describes one of a diverse range of textual concepts that a digital image can depict. Such textual concepts can include, but are not necessary limited to, particular object names, object descriptions, numbers of objects, landscape descriptions, geographic locations of a scene within a digital image, and locations of objects within a digital image, among others.

As mentioned above, the digital image matching system can determine visual attributes such as spatial selectivity. As used herein, the term "spatial selectivity" refers to a location within a digital image. To illustrate, spatial selectivity can include coordinate locations or spatial location indices in the form of vertical (e.g., row) coordinates i and horizontal (e.g., column) coordinates j. Accordingly, spatial selectivity can refer to a coordinate location of an object within a digital image. As described in further detail below, the digital image matching system can utilize a "spatial selectivity algorithm" to generate a deep neural network-based representation of a query digital image based on determining location-weighted global average pooling for a digital image. For example, using spatial selectivity, the digital image matching system can identify images that not only depict the same object as a query digital image, but also depict the object in a similar location as the query digital image.

The digital image matching system can further determine image composition of a digital image. As used herein, the term "image composition" refers to an arrangement or layout of a digital image. In particular, image composition can refer to relational positions of objects within a digital image (e.g., positions relative to other objects). As described in further detail below, the digital image matching system can utilize an "image composition algorithm" to generate a deep neural network-based representation of a query digital image based on establishing location-wise similarity of spatial arrangements of digital images. For example, using composition, the digital image matching system can identify images that not only depict the same objects as a query digital image, but also depict the objects in a similar arrangement as the query digital image.

In addition, the digital image matching system can determine object count of a digital image. As used herein, the term "object count" refers to a number of objects within a digital image. In particular, an object count can refer to a number of objects within a particular location or portion of a digital image. As described in further detail below, the digital image matching system can utilize an "object count algorithm" to generate a deep neural network-based representation of a query digital image based on implementing a subitizing-based similarity search to identify digital images having similar object counts as a query digital image.

As mentioned, the digital image matching system can generate a deep neural network-based representation for a query digital image. As used herein, the term "deep neural network-based representation" refers to a feature vector representation of a digital image. In some embodiments, a deep neural network-based representation can refer to a set or sequence of deep features that represent a digital image. For example, the digital image matching system can generate a deep neural network-based representation can by utilizing at least one of a spatial selectivity algorithm, an image composition algorithm, or an object count algorithm, as mentioned above and described in further detail below.

As used herein, the term "deep feature" (or sometimes simply "feature") refers to features of a digital image. Deep features can include visible features as well as latent or hidden features of a digital image analyzed within a neural network. To illustrate, deep features can include one or more feature vectors generated by one or more layers of a neural network to reflect a digital image. Deep features can include, for example, characteristics of a digital image at different levels of abstraction generated at various layers of a neural network. Deep features can contain non-linear characteristics of a digital image that are uninterpretable to human viewers.

As used herein, the term "deep neural network-based model" refers to a machine learning model. In particular, a deep neural network-based model can refer to a machine learning model that consists of one or more deep neural networks that the digital image matching system utilizes to generate feature maps and/or deep neural network-based representations of digital images. As used herein, the term "neural network" (or "artificial neural network") refers to an artificial machine-learning model that learns tasks by analyzing example data utilizing a plurality of layers that analyze features of the example data at different levels of abstraction. In particular, the term "neural network" can include a model of interconnected digital neurons that communicate and learn to approximate complex functions and generate outputs based on a plurality of inputs provided to the model. For example, a deep neural network can include an output layer such as a softmax layer withMhidden layers between the softmax layer and an input layer. Neural networks such as convolutional neural networks can model complex non-linear relationships by generating compositional models that represent data as layered compositions of information.

As mentioned, the digital image matching system utilizes a trained deep neural network-based model to generate a deep neural network-based representation of a query digital image. As used herein, the term "train" or "trained" or "training" refers to a process of teaching or tuning a machine learning model (e.g., the deep neural network-based model). In particular, the training can refer to a process of increasing the accuracy of a machine learning model using training data to generate representative feature vectors.

As further mentioned, the digital image matching system can receive an image mask for digital query images. As used herein, the term "image mask" refers to an indication of a portion of a digital image. In particular, an image mask can refer to an area or portion of a digital query image that a user selects, highlights, outlines, or otherwise defines by way of a user interface on a user client device. Based on receiving image masks, the digital image matching system can modify a deep neural network-based representation to weight any portions of digital query images indicated by the image masks.

As mentioned above, the digital image matching system can receive multiple query digital images from a user client device and can generate a multi-query vector representation to use as a basis for identifying similar digital images (e.g., images that share visual attributes with each of the received query digital images). As used herein, the term "multi-query vector representation" refers to a type of deep neural network-based representation. A multi-query vector representation can refer to a set of deep features that the digital image matching system generates to represent more than one query digital image together. In some embodiments, the digital image matching system can modify a deep neural network-based representation by utilizing an aggregation technique to generate a multi-query vector representation. For example, the digital image matching system can generate a multi-query vector representation in the form of a compound feature vector. As used herein, the term "compound feature vector" refers to a feature vector that includes features (e.g., deep features) of multiple digital images. Accordingly, a compound feature vector represents a composite or an amalgamation of visual attributes of multiple constituent query digital images.

More detail regarding the digital image matching system will now be provided with reference to the figures. For example, FIG. 1 illustrates a user interface 100 as displayed to a user by way of a user client device. The user interface 100 of FIG. 1 includes a query digital image 102, identified similar digital images 104, visual attribute options 106, and a weight option 108, in addition to other features.

As mentioned, the digital image matching system provides the user interface 100 to a user client device. As also mentioned, based on receiving the query digital image 102 from the client device, the digital image matching system provides the identified similar digital images 104 to the user client device. To identify and provide the similar digital images 104, the digital image matching system analyzes the query digital image 102. For example, the digital image matching system utilizes one or more neural networks (e.g., convolutional neural networks) to generate sequences of deep features for the query digital image 102 as well as for candidate digital images stored within a database.

More specifically, the digital image matching system utilizes a deep neural network-based model to generate feature maps that contain features the query digital image 102 (e.g., as output of a pool5 layer). Based on the feature maps, the digital image matching system further generates a deep neural network-based representation of the query digital image 102 by pooling the feature maps in accordance with one or more of spatial selectivity, image composition, or object count.

In addition, the digital image matching system can rank a plurality of digital images within a digital image database in order of relevance with respect to the query digital image 102. For example, the digital image matching system compares candidate digital images with the query digital image 102 to determine which images are most similar. Indeed, the digital image matching system can compare a candidate digital image with the query digital image 102 by utilizing a neural network to generate deep features for the candidate digital image and by further comparing the generated feature vector of the candidate digital image with the deep neural network-based representation of the query digital image 102. Furthermore, the digital image matching system provides the similar digital images 104 to the user client device in the order of their relevance to the query digital image 102.

In some embodiments, the digital image matching system determines similarity scores for each of the plurality of digital images and ranks the images based on their respective similarity scores. For example, the digital image matching system can utilize a similarity search function to generate similarity scores. In some embodiments, the digital image matching system can utilize a different similarity search function for spatial selectivity, image composition, and object count, as described in further detail below. Indeed, the digital image matching system can modify a similarity search function based on the different considerations for identifying similar images based on spatial selectivity, image composition, and object count.

In some embodiments, the digital image matching system can determine similarity scores by utilizing a loss function. Indeed, the digital image matching system can utilize a loss function to compare the deep neural network-based representation of the query digital image 102 with feature vectors of candidate digital images. Thus, the digital image matching system can utilize a loss function (e.g., a mean squared error function or a cross-entropy loss function) to determine similarity scores in the form of a measure of loss between the features of the query digital image 102 and the features of the candidate images. In some embodiments, the digital image matching system normalizes a similarity score (e.g., to be on a scale from 0 to 1). In some embodiments, a given similarity score can either be directly related to a determined measure of loss, while in other embodiments the similarity score can be inversely related to the determined measure of loss.

In some embodiments, the digital image matching system determines semantic similarity scores by comparing image tag scores for the query digital image 102 with image tag scores for each of the plurality of digital images. Indeed, the digital image matching system can determine image tag scores for the query digital image 102 based on the deep neural network-based representation of the query digital image 102. Likewise, for candidate digital images, the digital image matching system can determine (or access predetermined) image tag scores for candidate digital images based on the feature vectors associated with each candidate image.

To compare the image tag scores for the query digital image 102 with those of a candidate digital image, the digital image matching system can determine a difference between image tag scores. For instance, the digital image matching system can compare like quantities by determining a difference between a score of a first image tag for a candidate digital image and a score of the same image tag for the query digital image 102. Likewise, the digital image matching system can determine, for the query digital image 102 and a candidate digital image, differences between each image tag score. In some embodiments, the digital image matching system can utilize a distance function to determine an overall (e.g., average) distance between all (or a subset) of the image tag scores for the query digital image 102 and a given candidate digital image. The digital image matching system determines higher similarity scores for those digital images whose image tag scores more closely resemble the image tag scores associated with the query digital image 102 (e.g., where the image tag scores have a smaller distance or difference between them).

To elaborate, as a baseline for generating deep neural network-based representations of query digital images, the digital image matching system utilizes a Residual Network model (e.g., TagRestNet-50) trained for image tagging—i.e., for determine a probability that each of a set of image tags corresponds to the query digital image 102. Given the query digital image 102, the digital image matching system utilizes the deep neural network-based model to predict or determine scores for a set of image tags (e.g., a set of 18,157 image tags) that cover a diverse range of textual concepts. The digital image matching system performs, for the query digital image 102, a forward pass of the deep neural network-based model to extract feature maps as a resource for generating a deep neural network-based representation of the query digital image 102. For instance, from the deep neural network-based model, the digital image matching system takes the pool5 layer's output, $y \in \mathbb{R}^{2048 \times h \times w}$, as features for searching for and identifying the similar digital images 104, where $c \in \mathbb{Z}$, $h \in \mathbb{Z}$, and $w \in \mathbb{Z}$ are the number of channels, height, and width of the feature maps $y \in \mathbb{R}^{2048 \times h \times w}$, respectively.

The digital image matching system globally pools the feature maps $y \in \mathbb{R}^{2048 \times h \times w}$ and reshapes the feature maps into a deep neural network-based representation in the form of a feature vector $y_{gp} \in \mathbb{R}^{2048}$. In addition, to search for similar digital images, the digital image matching system utilizes a similarity search function $F(\cdot)$ that takes a convolutional neural network feature vector $y_{gp}$ of a query digital image as input. More specifically, the digital image matching system implements a similarity search operation, $S = F(y_{gp})$, that takes the feature vector $y_{gp}$ of the query digital image 102 as an input and returns a list of similarity scores $S \in \mathbb{R}^N$ for a plurality of digital images from within a digital image database, where N is the number of digital images within the digital image database.

For efficient, non-exhaustive searching of the digital image database to identify similar digital images, the digital image matching system can further utilize an Optimized Product Quantization ("OPQ") technique as well as an inverted indexing technique. For example, the digital image matching system can implement the OPQ technique described in Tiezheng Ge, Kaiming He, Qifa Ke, and Jian Sun, *Optimized Product Quantization for Approximate Nearest Neighbor Search*, Proceedings of the IEEE Conference on Computer Vision and Pattern Recognition, 2946-53 (2013), which is incorporated herein by reference in its entirety. In particular, the digital image matching system can decompose a high-dimensional space into a Cartesian product of a finite number of low-dimensional subspaces that are each quantized separately. In addition, the digital image matching system can optimize the product quantization can by minimizing quantization distortions by applying a non-parametric method and/or a parametric method that achieves an optimal solution given that the input data follows a Gaussian distribution.

As illustrated in FIG. 1, the user interface 100 includes an indication of a user selection of a visual attribute option 106 to use to identify similar digital images 104. Based on the user selection of a particular visual attribute option 106, the digital image matching system generates a corresponding deep neural network-based representation to identify similar digital images 104. In particular, the user interface 100 illustrates that a user has selected to search for similar digital images based on "Similarity." Based on receiving the query digital image 102 in conjunction with the user selection of the visual attribute "Similarity," the digital image matching system generates a deep neural network-based representation for the query digital image 102 as a basis for identifying the similar digital images 104 in accordance with spatial selectivity constraints. In particular, the digital image matching system utilizes a spatial selectivity algorithm based on the user selection of "Similarity." While FIG. 1 illustrates the selectable option labeled as "Similarity," in some embodiments the user interface 100 includes a different label such as "Selectivity" or "Spatial Selectivity" or a similar label.

In any case, based on the user selection of a visual attribute option 106 that corresponds to a spatial selectivity analysis, the digital image matching system utilizes a spatial selectivity algorithm to generate a deep neural network-based representation for the query digital image 102. More specifically, the digital image matching system implements a location-weighted global pooling technique with the feature maps $y \in \mathbb{R}^{2048 \times h \times w}$ of the above-described baseline. To illustrate, as described above, the digital image matching system utilizes a deep neural network-based model to extract the feature maps $y \in \mathbb{R}^{2048 \times h \times w}$ and the digital image matching system utilizes these feature maps as input for a global average pooling function. For example, the digital image matching system determines the pooled feature maps (for the query digital image 102) $y_{gp} \in \mathbb{R}^{2048}$ by:

$$y_{gp} = \frac{\sum_{i=1}^{h}\sum_{j=1}^{w} y^{i,j}}{hw}$$

where i and j are spatial location indices in vertical/row and horizontal/column directions, respectively. Thus, the digital image matching system generates a deep neural network-based representation of the query digital image 102 in the form of a feature vector $y_{gp}$ by pooling the feature maps $y \in \mathbb{R}^{2048 \times h \times w}$ in accordance with a spatial selectivity algorithm.

By utilizing this spatial selectivity algorithm, the digital image matching system treats all locations within the query digital image 102 equally, ignoring the importance of certain sub-regions in the feature maps and in the query digital image 102. If a query digital image contains a small-sized object of interest surrounded by much bigger background regions, however, the global average pooling technique for the spatial selectivity algorithm may skew results (e.g., feature vectors) toward the background regions as a result of the equal treatment across the query digital image 102.

Consequently, the digital image matching system identifies similar digital images 104 that are more visually similar to the background regions than the foreground object. Thus, as illustrated in FIG. 1, the digital image matching system identifies the similar digital images 104 that are visually similar the query digital image 102 based on an equally-weighted analysis across the query digital image 102. As mentioned, the digital image matching system can identify similar images based on a comparison of deep features. Indeed, the digital image matching system can determine and/or access deep neural network-based representations of digital images to compare with the deep neural network-based representation of the query digital image 102.

Figure 2:
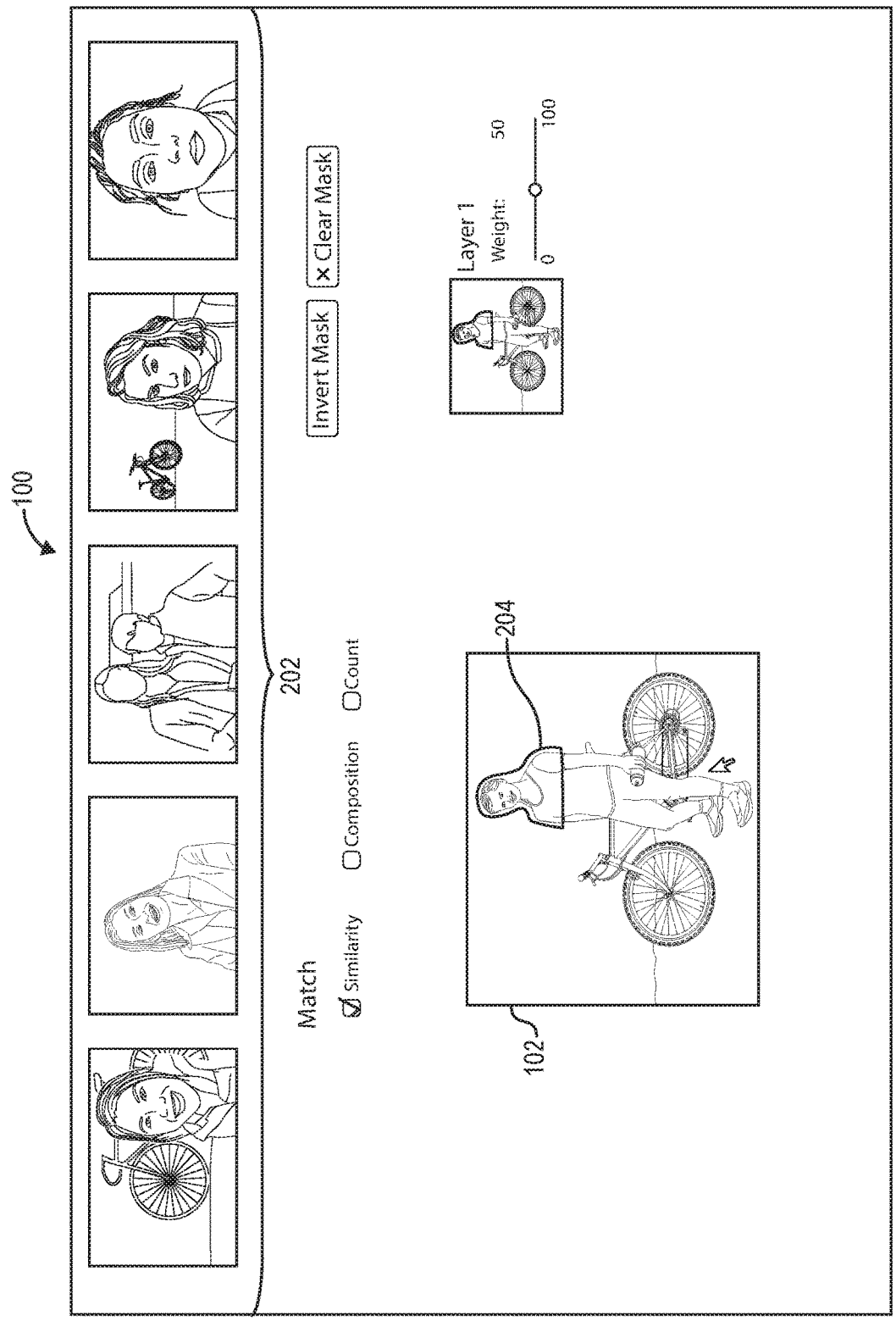
FIG. 2 illustrates a user interface including a query digital image with an image mask in accordance with one or more embodiments.

In some embodiments, the digital image matching system implements a location-weighted global average pooling technique to weight certain portions of the query digital image 102 more heavily (e.g., to emphasize those portions in identifying similar digital images). By weighting portions of the query digital image 102, the digital image matching system can identify different similar digital images than the similar digital images 104 by skewing the search toward digital images that more closely resemble the visual attributes of any indicated portions of the query digital image 102. Indeed, FIG. 2 illustrates the user interface 100 including the query digital image 102 and identified similar digital images 202. As shown, the similar digital images 202 differ from the similar digital images 104 of FIG. 1. In particular, the similar digital images 104 of FIG. 1 each illustrate a bicycle (most also illustrate a person accompanying the bicycle), whereas the similar digital images 202 of FIG. 2 more heavily emphasize faces of individuals (some of which also include bicycles).

To identify the similar digital images 202 of FIG. 2, the digital image matching system receives an image mask 204. In particular, the digital image matching system receives a selection of a portion of the query digital image 102 that the digital image matching system utilizes to modify the deep neural network-based representation of the digital image 102. As shown, the image mask 204 outlines a face of a person shown within the query digital image 102. Accordingly, the digital image matching system utilizes a deep neural network-based model to generate a weighted deep neural network-based representation of the digital image 102. For instance, within the deep neural network-based representation, the digital image matching system weights the portion (e.g., the features corresponding to the portion) of the query digital image 102 defined by the image mask 204.

To illustrate, the digital image matching system modifies the deep neural network-based representation to account for weighting the portion of the query digital image 102 indicated by the image mask 204. For example, the digital image matching system can utilize a modified spatial selectivity algorithm to generate a modified (e.g., weighted) deep neural network-based representation in the form of:

$$y_{\widehat{gp}} = \frac{\sum_{i=1}^{h}\sum_{j=1}^{w} m^{i,j} y^{i,j}}{\sum_{i=1}^{h}\sum_{j=1}^{w} m^{i,j}}$$

where m represents an image mask (e.g., the image mask 204).

As illustrated in FIG. 2, the digital image matching system can receive the image mask 204 as input by a user by way of the user interface 100. Indeed, the digital image matching system can provide various tools within the user interface 100 by which the user can define the image mask 204. For example, although FIG. 2 illustrates the image mask 204 as an outline around the jumping woman in the query digital image 102, the digital image matching system can provide a tracing tool, a lasso tool, a bounding box tool, a brush tool, a coordinate location tool, a highlighter tool, or some other tool by which the user can define portion of the query digital image 102 for the image mask 204. Thus, in some embodiments, the image mask 204 may have a different appearance than is shown in FIG. 2.

In some embodiments, however, the digital image matching system can automatically (e.g., without user input) determine m through saliency detection methods to generate saliency maps whose pixel values correspond to region importance. Accordingly, the digital image matching systems can intelligently determine whether to implement a weighted deep neural network-based representation to account for an image mask by analyzing the query digital image 102 according to saliency detection methods.

As mentioned, and as shown in FIG. 2, the similar digital images 202 differ from the similar digital images of FIG. 1. Indeed, as a result of utilizing the modified deep neural network-based representation whereby the digital image matching system weights the portions of the query digital image 102 indicated by the image mask 204, the digital image matching system identifies similar digital images 202 that emphasize the features corresponding to the face shown within the query digital image 102. As shown, the similar digital images 202 each depict at least one person's face, whereas the same is not true of the similar digital images 104 of FIG. 1. Indeed, as a result of utilizing an unweighted deep neural network-based representation, one of the similar digital images 104 has a bicycle without any person at all.

Although FIG. 2 illustrates results of using a specific deep neural network-based representation (e.g., as a result of a spatial selectivity algorithm), in some embodiments the digital image matching system can generate a different deep neural network-based representation. For example, in cases where a user selects a different visual attribute option 106 (e.g., "Composition" or "Count"), the digital image matching system can generate a corresponding deep neural network-based representation. To illustrate, the digital image matching system can utilize an image composition algorithm and/or an object count algorithm in addition, or alternatively, to the spatial selectivity algorithm described above. Additional detail regarding the image composition algorithm and the object count algorithm is provided below with specific reference to FIG. 6.

As mentioned, the digital image matching system can receive more than one query digital image, and in response to receiving multiple query digital images, can generate a multi-query vector representation. Indeed, FIG. 3 illustrates a user interface 300 including more than one query digital image (e.g., query digital images 302 and 308), similar digital images 304, visual attribute options 306, and image mask 310.

Figure 3:
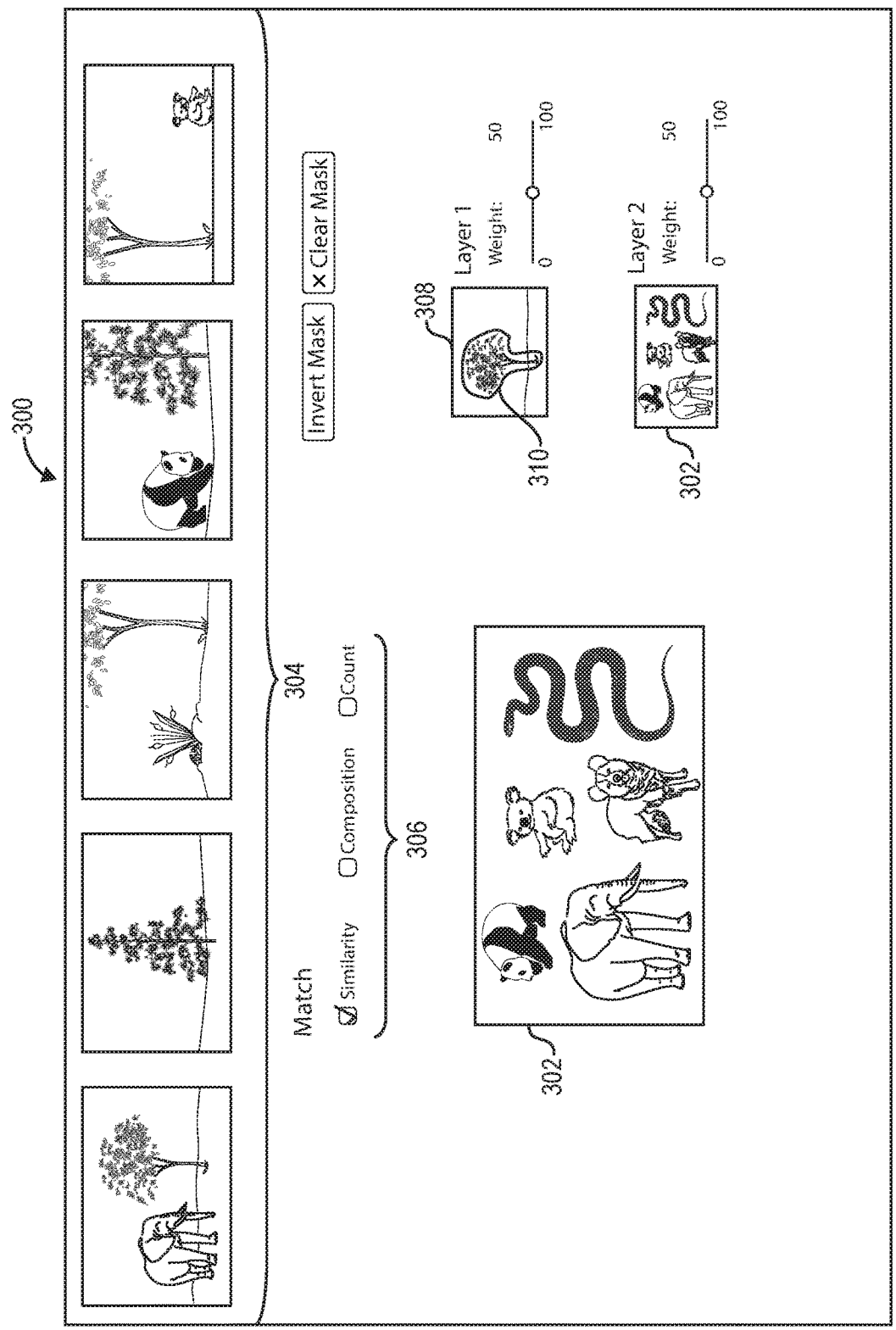
FIG. 3 illustrates a user interface including multiple query digital images in accordance with one or more embodiments.

As illustrated in FIG. 3, the digital image matching system initially receives a first query digital image 308 (e.g., "Layer 1") and subsequently receives a second query digital image 302 (e.g., "Layer 2"). In addition, the digital image matching system can analyze each of query digital images 308 and 302 to identify similar digital images 304 from within a digital image database. To illustrate, similar to the discussion above in relation to FIGS. 1-2, the digital image matching system can utilize a deep neural network-based model to generate a multi-query vector representation of the query digital images 308 and 302 to use as a basis for identifying the similar digital images 304. Indeed, the digital image matching system can identify the similar digital images 304 as images within a database that share similar features to the multi-query vector representation of the query digital images 308 and 302.

More specifically, to generate a multi-query vector representation for the query digital images 308 and 302, the digital image matching system generates a compound feature vector that represents visual attributes of the query digital image 308 as well as visual attributes of the query digital image 302. To elaborate, the digital image matching system balances each of query digital images 308 and 302 so that no query digital image is more dominant (e.g., outweighs) any other query digital image. For example, in some embodiments the digital image matching system performs a re-ranking technique by taking a number of top single-query search results (e.g., a first set of digital images that are similar to query digital image 308) and re-ranking the single query search results using similarity scores that indicate a similarity with other single-query search results (e.g., a second set of digital images that are similar to query digital image 302).

More specifically, the digital image matching system can generate a deep neural network-based model and identify similar digital images for the query digital image 308 in accordance with the techniques and methods described above in relation to FIGS. 1-2. Similarly, the digital image matching system can generate a deep neural network-based model and identify similar digital images for the query digital image 302. In these embodiments, the digital image matching system does not generate a multi-query representation for the query digital images 308 and 302 together, but instead identifies similar images for each independently of the other.

In some embodiments, on the other hand, the digital image matching system performs a feature aggregation technique with respect to the multi-query vector representation mentioned above. To elaborate, instead of performing separate searches using feature vectors of multiple query digital images (e.g., as is done for re-ranking), the digital image matching system can aggregate feature vectors of query digital images. For example, the digital image matching system can aggregate or combine a feature vector associated with the query digital image 308 with a feature vector associated with the query digital image 302. Accordingly, the digital image matching system can generate a multi-query vector representation in the form of a compound feature vector that represents a composite of the two feature vectors (e.g., the feature vectors of query digital images 308 and 302).

In some embodiments, the digital image matching system averages the feature vectors of the query digital images 308 and 302. In other embodiments, however, the digital image matching system utilizes a different technique for feature vectors that do not have similar value ranges or whose vector norms are substantially different (e.g., where feature vectors with larger values or norms would dominate search results, causing an imbalance of query digital image contributions). In particular, the digital image matching system generates a multi-query vector representation by normalizing individual feature vectors (e.g., the feature vector associated with query digital image 308 and the feature vector associated with query digital image 302) before averaging the feature vectors.

To illustrate, let $y_{(1)}, y_{(2)}, \ldots, y_{(N)}$ denote the feature vectors of N number of query digital images. Thus, the digital image matching system generates a multi-query vector representation, $y_{multi}$, by utilizing a feature aggregation technique given by:

$$y_{multi} = \frac{1}{N}\sum_{i=1}^{N} \frac{y_{(i)}}{\|y_{(i)}\|_2} \times \frac{1}{N}\sum_{i=1}^{N} \|y_{(i)}\|_2$$

where the first term $$\left(\frac{1}{N}\sum_{i=1}^{N} \frac{y_{(i)}}{\|y_{(i)}\|_2}\right)$$

corresponds to the averaging of L2-normalized feature vectors of multiple query digital images and the second term $$\left(\frac{1}{N}\sum_{i=1}^{N} \|y_{(i)}\|_2\right)$$

un-normalizes the average normalized feature vectors. By utilizing the second term (e.g., the un-normalization step), the digital image matching system makes the vector norm compatible with the norms of the digital images within the digital image database, as described in Tiezheng Ge, Kaiming He, Qifa Ke, and Jian Sun, *Optimized Product Quantization for Approximate Nearest Neighbor Search*, in Proceedings of the IEEE Conference on Computer Vision and Pattern Recognition, 2946-2953 (2013), which is incorporated herein by reference in its entirety.

As mentioned, the digital image matching system can apply an aggregation technique to any of the deep neural network-based representations described herein. Indeed, the digital image matching system can modify a deep neural network-based representation by utilizing one or more of the spatial selectivity algorithm, the image composition algorithm, and/or the object count algorithm for multi-query scenarios as well as single-query scenarios. To merge features of digital images, in some embodiments the digital image matching system can perform an averaging on normalized multi-query features followed by an un-normalization step.

In other embodiments, the digital image matching system can generate similar digital images for query digital image 308 independently of query digital image 302. Likewise, the digital image matching system can generate a second set of similar digital images with respect to query digital image 302. Additionally, the digital image matching system can compare the relative rankings of digital images similar to query digital image 308 and digital images similar to query digital image 302. The digital image matching system can also determine similarity scores for a multi-query vector representation of both query digital images 308 and 302 based on comparing the relative rankings. Thus, based on determining the similarity scores for digital image 302 after having done so for digital image 308, the digital image matching system can re-rank the search results based on the comparison of relative rankings. Indeed, the digital image matching system can rank higher in the search results those digital images associated with query digital image 308 that have higher similarity scores with the digital images associated with the query digital image 302.

As illustrated in FIG. 3, the digital image matching system can receive an image mask 310 that corresponds to the query digital image 308. As shown, the image mask 310 indicates a portion of the query digital image 308 that depicts a tree. Accordingly, as described above, the digital image matching system generates a modified deep neural network-based representation that accounts for weighting the portion of the query digital image 308 that is indicated by the image mask 310.

Thus, as shown, the digital image matching system identifies similar digital images 304 that each contain a tree. In addition, because the digital image matching system not only receives the query digital image 308 and the corresponding image mask 310, but further receives the query digital image 302 which depicts a number of various animals, the digital image matching system further identifies some similar digital images 304 that include animals.

Figure 4:
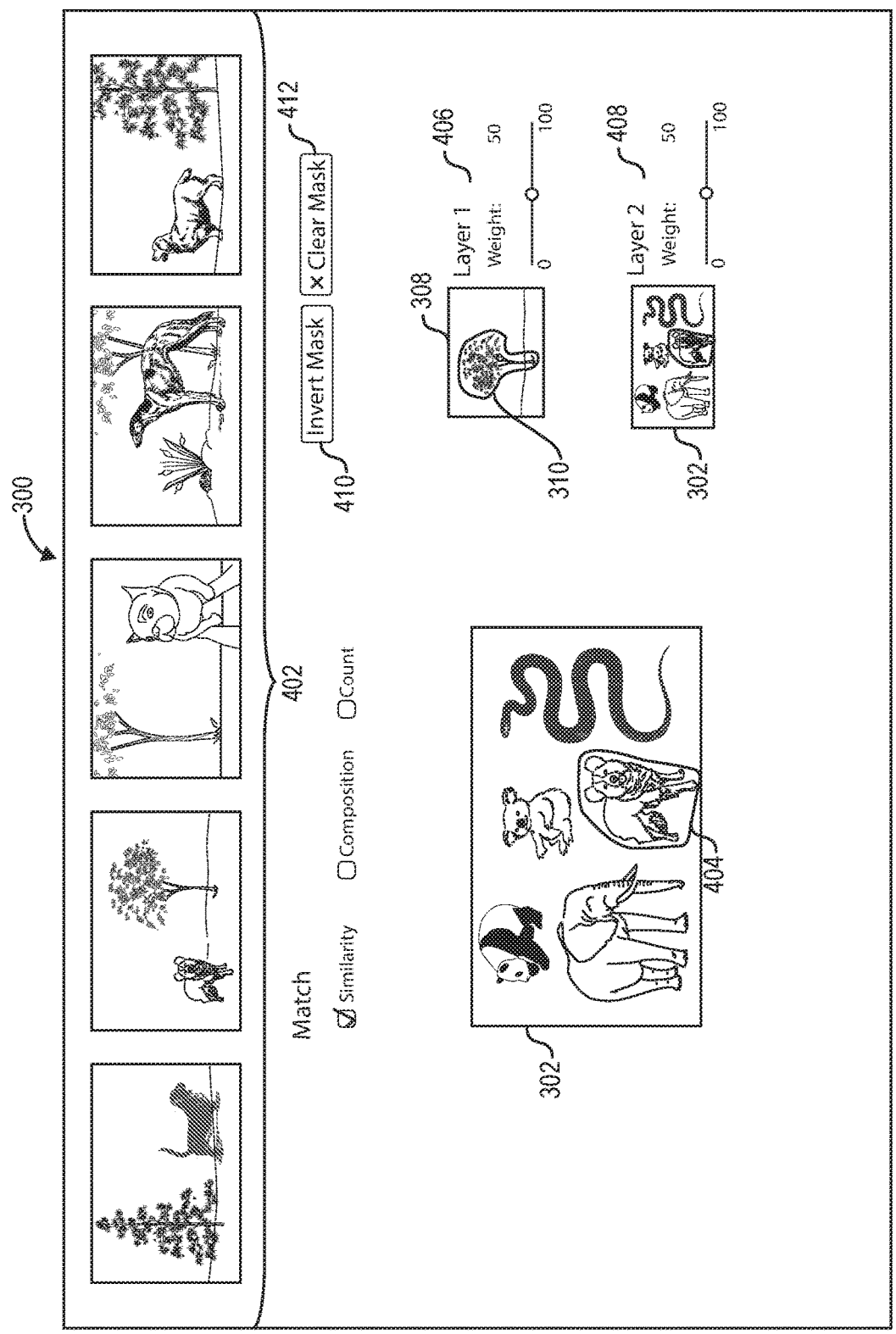
FIG. 4 illustrates a user interface including multiple image masks in accordance with one or more embodiments.

As mentioned, the digital image matching system can receive more than one image mask. Indeed, the digital image matching system can receive the image mask 310 in addition to an image mask corresponding to the query digital image 302. As illustrated in FIG. 4, the digital image matching system can receive the same query digital images 308 and 302, in addition to image masks 310 and 404.

FIG. 4 illustrates the user interface 300 including the query digital image 302, the query digital image 308, the image mask 310, the image mask 404, the similar digital images 402, the weight options 406 and 408, the invert mask option 410, and the clear mask option 412. Continuing the discussion from FIG. 3, the digital image matching system receives the query digital image 308 along with the accompanying image mask 310 as well as the query digital image 302. In addition, the digital image matching system receives the image mask 404 that indicates a portion of the query digital image 302 to emphasize in generating a multi-query vector representation. As shown, the digital image matching system receives an image mask 404 that outlines a dog within the query digital image 302.

Based at least in part on receiving the image mask 404, the digital image matching system identifies similar digital images 402 that depict dogs (particularly dogs that look similar to the dog of the image mask 404). For instance, the digital image matching system applies the techniques described above to utilize a deep neural network-based model to generate a modified deep neural network-based representation that aggregates features of the query digital image 308 with features of the query digital image 302 to generate a compound feature vector, and which further applies weights to the image mask 310 and the image mask 404. By analyzing the query digital images 308 and 302 in this way, the digital image matching system can search a digital image database to identify similar digital images 402 that depict a tree (e.g., as indicated by the image mask 310) and at least one dog (e.g., as indicated by the image mask 404).

As further illustrated in FIG. 4, the user interface 300 includes weight options 406 and 408. In particular, the user interface 300 shows each weight option 406 and 408 with a weight of 50—i.e., each of query digital images 308 and 302 are evenly weighted. However, the digital image matching system can receive a user input to modify a weight associated with the query digital image 308 and a user input to modify a weight associated with the query digital image 302. For example, the digital image matching system can receive a user input in relation to the weight option 406 to adjust a weight given to the query digital image 308. Similarly, the digital image matching system can receive a user input in relation to the weight option 408 to adjust a weight given to the query digital image 302.

Based on receiving a user interaction/input in relation to the weight options 406 and/or 408, the digital image matching system modifies the deep neural network-based representation (e.g., the multi-query vector representation). In particular, the digital image matching system modifies the deep neural network-based representation to adjust the impact of the query digital images 308 and 302 as part of identifying similar digital images. For example, in response to receiving a user input to increase the weight option 406, the digital image matching system weights the features of the query digital image 308 accordingly as part of generating the compound feature vector. Thus, as a result of the increased weight, the digital image matching system generates a multi-query vector representation (e.g., a compound feature vector) that is more reflective of the features of the query digital image 308—i.e., that is skewed toward the query digital image 308.

As also shown in FIG. 4, the user interface 300 includes an invert mask option 410. In response to receive a user interaction (e.g., a click, tap, touch, etc.) with respect to the invert mask option 410, the digital image matching system inverts an image mask. To illustrate, the digital image matching system inverts an image mask that corresponds to a query digital image that is currently selected. For example, as shown in FIG. 4, the query digital image 302 is currently selected. Thus, in response to receiving a user interaction with the invert mask option 410, the digital image matching system inverts the image mask 404 of the query digital image 302.

To invert the image mask 404, the digital image matching system considers all portions outside of the image mask 404 as the masked portions of the query digital image 302. To elaborate, ordinarily the digital image matching system emphasizes (e.g., weights) those portions of the query digital image 302 indicated within the image mask 404 in searching for and identifying the similar digital images 402. However, in response to receiving a user selection of the invert mask option 410, the digital image matching system performs the converse operation by weighting those portions of the query digital image 302 that are outside of the image mask 404—effectively masking those portions of the query digital image 302. Thus, the digital image matching systems can invert an image mask 404 to emphasize portions of the query digital image 302 outside of where a user defines the image mask 404.

As further illustrated in FIG. 4, the user interface 300 includes a clear mask option 412. In response to receiving a user selection or other input in relation to the clear mask option 412, the digital image matching system clears an image mask corresponding to a selected query digital image. To illustrate from FIG. 4, the query digital image 302 is currently selected. Thus, in response to receiving a user selection of the clear mask option 412, the digital image matching system clears (e.g., removes, deletes, etc.) the image mask 404 from the query digital image 302.

Figure 5:
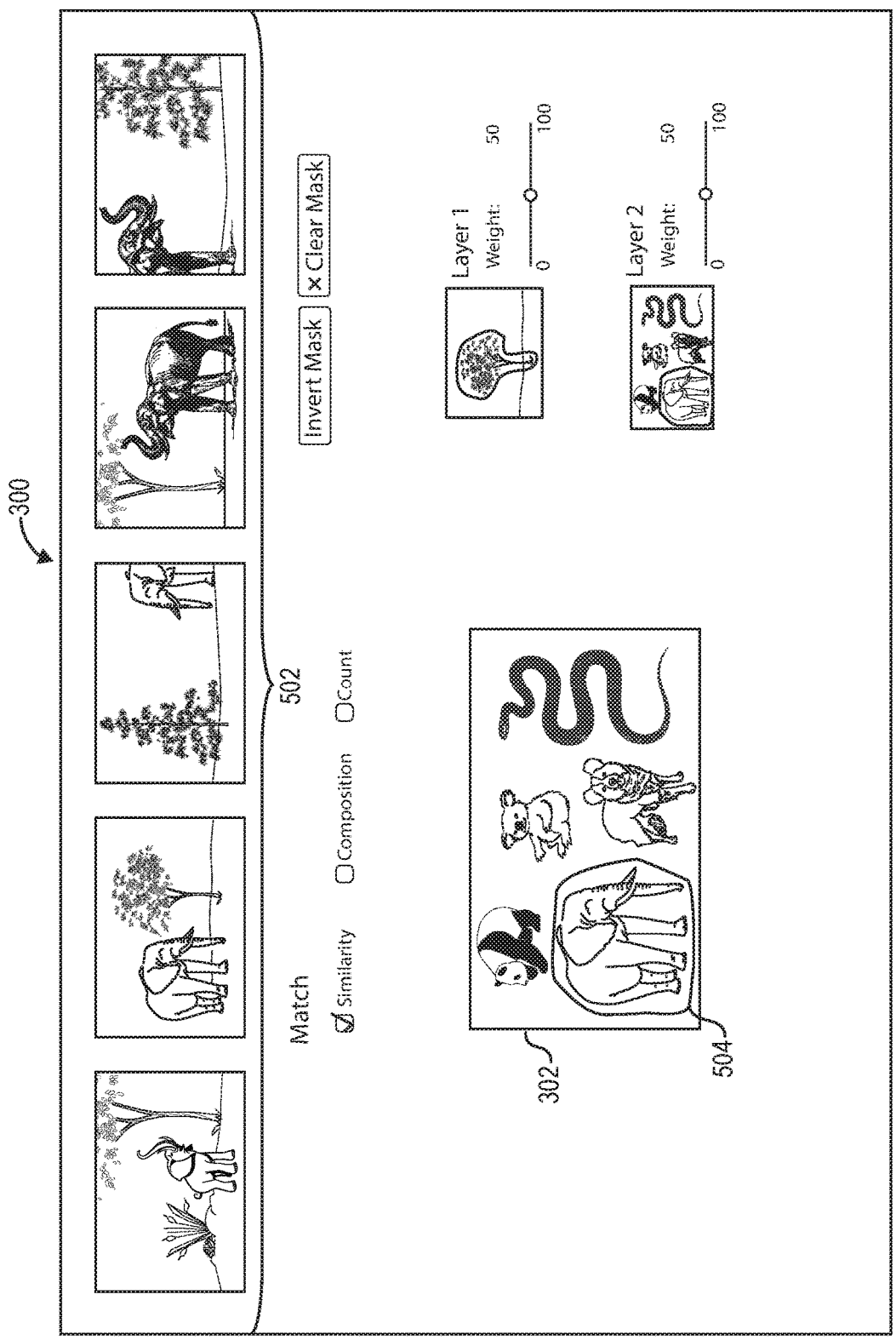
FIG. 5 illustrates modifying results of similar digital images based on receiving a new image mask in accordance with one or more embodiments.

Upon clearing the image mask 404, the digital image matching system can receive a user selection of a new image mask and can subsequently identify new similar digital images. Indeed, FIG. 5 illustrates the user interface 300 including most of the same elements as shown in FIG. 4, but with a new image mask 504 on the query digital image 302. Based on receiving the image mask 504 that indicates a portion of the query digital image 302 depicting an elephant, the digital image matching system utilizes the deep neural network-based model including a deep neural network-based representation that accounts for each query digital image and the respective image masks to search for and identify similar digital images 502 that depict elephants and trees together. Indeed, as described above, the digital image matching system can identify similar digital images that more closely resemble portions of query digital images depicted within image masks.

Figure 6:
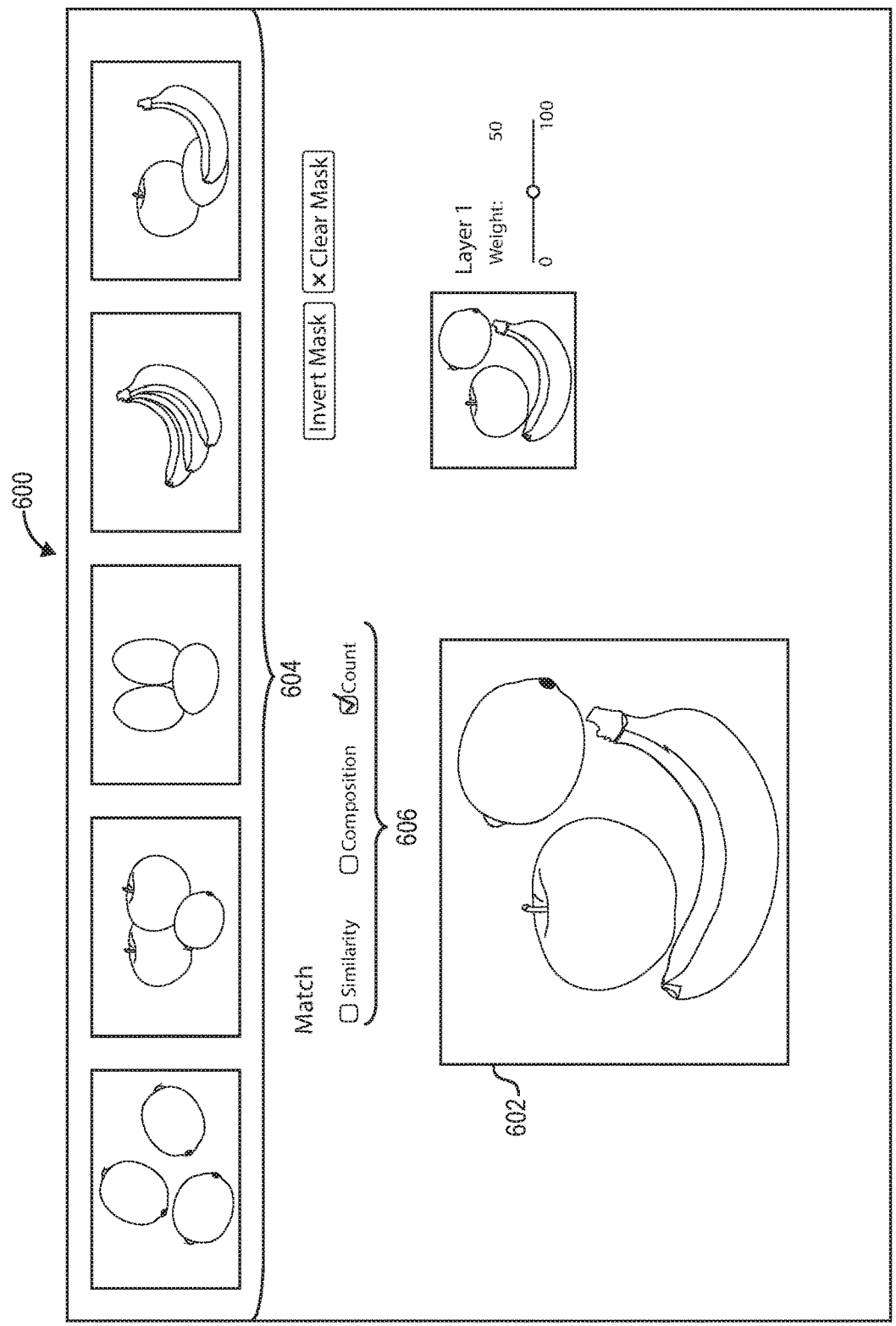
FIG. 6 illustrates a user interface for identifying similar digital images based on object count in accordance with one or more embodiments.

While FIGS. 1-5 illustrate a user selection of the visual attribute option "Similarity," in some embodiments the user selects a different visual attribute option in addition, or alternatively, to "Similarity." Thus, the digital image matching system can utilize a different algorithm in generating a deep neural network-based representation in addition, or alternatively, to the selective similarity algorithm. For example, as shown in FIG. 6, in some embodiments the digital image matching system receives a user selection of the visual attribute options for "Composition" and/or "Count" visual attribute options 606. Based on receiving a user selection of a visual attribute option 606 that corresponds to an object count analysis (e.g., the "Count" option), the digital image matching system utilizes an object count algorithm.

As mentioned, the digital image matching system utilizes an object count algorithm in response to receiving a user selection of the "Count" visual attribute option 606. Indeed, FIG. 6 illustrates a user interface 600 including a query digital image 602, similar digital images 604, and visual attribute options 606 where "Count" is selected. Based on determining that "Count" is selected, the digital image matching system utilizes a subitizing technique to count objects within the query digital image 602. In some embodiments, the digital image matching system utilizes a subitizing network to generate features with strong correspondence to object counts as part of the object count algorithm for generating a deep neural network-based representation. For example, the digital image matching system implements the subitizing network described in Jianming Zhang, Shugao Ma, Mehrnoosh Sameki, Stan Sclaroff, Margrit Betke, Zhe Lin, Xiaohui Shen, Brian Price, and Radomir Mech, *Salient Object Subitizing*, Proceedings of the IEEE Conference on Computer Vision and Pattern Recognition, 4045-54 (2015), which is incorporated herein by reference in its entirety. As similarly described above, the digital image matching system takes the network activations (e.g., 128-dimensional feature vectors) prior to the final classification layer as the descriptors for a similarity search to identify the similar digital images 604.

By utilizing the object count algorithm, the digital image matching system identifies similar digital images 604 based on the query digital image 602. In particular, the digital image matching system determines similarity scores for a plurality of digital images within a digital image database based on object counts. Based on the similarity scores, the digital image matching system ranks the plurality of digital images to identify similar digital images 604 that depict the same (or a similar) number of objects as the query digital image 602.

Although not illustrated in FIG. 6, the digital image matching system can additionally or alternatively receive a user selection of the "Composition" visual attribute option 606. Based on receiving the user selection of the "Composition" visual attribute option 606, the digital image matching system can utilize an image composition algorithm to generate a deep neural-network based representation of the query digital image 602.

To elaborate, as part of the image composition algorithm, the digital image matching system spatially pools the feature maps $y \in \mathbb{R}^{2048 \times h \times w}$ of the above-described baseline to the dimensions of the query digital image 602. Sometimes global pooling can discard spatial structure with a query digital image as well as information of feature maps. Thus, searching for visually similar digital images using only globally pooled features may result in similar digital images that are similar in terms of semantic content, without much emphasis on arrangements of objects and/or backgrounds of the query digital image 602. For instance, two different query digital images of the same object but from different vantages may result in similar globally pooled features.

Accordingly, to enable more accurate visual similarity search based on image composition (e.g., arrangement, layout, or positioning), the digital image matching system implements an image composition algorithm to generate a deep neural-network based representation by spatially pooling the feature maps to the height of $h_{comp} \in \mathbb{Z}$ and the width of $w_{comp} \in \mathbb{Z}$. As described above, the digital image matching system utilizes the deep neural network-based model to generate the feature maps $y_{cp} \in \mathbb{R}^{2048 \times h_{comp} \times w_{comp}}$ for composition similarity search.

To achieve a balance between spatial structure preservation and spatial restrictiveness, the digital image matching system can utilize preset (e.g., user-defined or system-defined) values for $h_{comp}$ and $w_{comp}$. For example, in some embodiments the digital image matching system sets each of $h_{comp}$ and $w_{comp}$ to 3. In other embodiments, the digital image matching system sets $h_{comp}$ and $w_{comp}$ to some other value (e.g., 5, 10, etc.).

Additionally, for feature maps y of query digital images (e.g., query digital image 602) of any spatial size, the digital image matching system utilizes an adaptive spatial pooling technique to uniformly pool the feature maps y into 3×3 vectors. For example, in some embodiments the digital image matching system implements the adaptive social pooling described in Kaiming He, Xiangyu Zhang, Shaoquing Ren, and Jian Sun, *Spatial Pyramid Pooling in Deep Convolutional Networks for Visual Recognition*, European Conference on Computer Vision, Springer, 346-61 (2014), which is incorporated herein by reference in its entirety.

As described above, the digital image matching system utilizes a similarity search function F(•) to identify similar digital images (e.g., similar digital images 604). For composition similarity based on an image composition algorithm, the digital image matching system utilizes a location-wise similarity search function, $F_{comp}^{i,j}(•)$ where i and j are the location indices, as described above. Each instance of the location-wise similarity search function $F_{comp}^{i,j}(•)$ handles the visual similarity for its corresponding location within the query digital image 602.

In contrast to a single similarity database, the digital image matching system utilizes multiple similarity databases for image composition analysis, each of which stores feature vectors corresponding to a specific location (e.g., among the $h_{comp} \times w_{comp}$ grid) of digital images within a digital image database. In addition, to determine composition similarity scores $S_{comp}$, the digital image matching system passes feature vectors of different spatial locations within the $h_{comp} \times w_{comp}$ grid of feature maps $y_{cp}$ to F(•). The digital image matching system aggregates the similarity scores of the feature vectors according to:

$$S_{comp} = \frac{\sum_{i=1}^{h_{comp}} \sum_{j=1}^{w_{comp}} F_{comp}^{i,j}(y_{cp}^{i,j})}{h_{comp} w_{comp}}.$$

Similar to the discussion above in relation to the spatial selectivity algorithm, the digital image matching system can further account for image masks indicated within query digital images as part of the image composition analysis. Indeed, the digital image matching system can modify the image composition algorithm to enhance spatial selectivity and give importance to certain locations in $y_{cp}$ via automated saliency detection and/or user input of image masks. For example, given an image mask weight m, the digital image matching system aggregates the similarity scores of the feature vectors of digital images within a digital image database according to:

$$S_{\widetilde{comp}} = \frac{\sum_{i=1}^{h_{comp}} \sum_{j=1}^{w_{comp}} m^{i,j} F_{comp}^{i,j}(y_{cp}^{i,j})}{h_{comp} w_{comp} \sum_{i=1}^{h_{comp}} \sum_{j=1}^{w_{comp}} m^{i,j}}.$$

In some embodiments, the digital image matching system receives a user selection of more than one visual attribute option 606. In these embodiments, the digital image matching system generates a deep neural network-based representation that accounts for each of the selected visual attribute options 606. For example, the digital image matching system can generate a combined or composite deep neural network-based representation in the form of a linear combination of feature vectors corresponding to each selected visual attribute option 606. In some embodiments, the digital image matching system sums the feature vectors corresponding to each selected visual attribute option 606 together to generate the combined deep neural network-based representation.

In addition, the digital image matching system can aggregate multiple visual similarities by determining weighted sums of the similarity scores associated with the spatial selectivity algorithm, the image composition algorithm, and/or the object count algorithm. Indeed, the digital image matching system determines the weighted sum of similarity scores as:

$$S_{agg} = w_{sem} S_{sem} + w_{comp} S_{comp} + w_{subi} S_{subi}$$

where $S_{agg}$ is the aggregate similarity score, $S_{sem}$ is the semantic similarity score (e.g., in relation to the spatial selectivity algorithm), $S_{comp}$ is image composition similarity score, $S_{subi}$ is the object count similarity score (i.e., subitizing similarity score), $w_{sem}$ is a weight associated with the semantic similarity score, $w_{comp}$ is a weight associated with the image composition similarity score, and $w_{subi}$ is a weight associated with the object count/subitizing similarity score.

In some embodiments, the digital image matching system utilizes preset (e.g., user-defined through the user interface 600 or system-defined) values for $w_{sem}$, $w_{comp}$, and $w_{subi}$. Indeed, although not shown in FIG. 6, the user interface 600 can include, in addition (or alternatively) to the checkboxes for visual attribute options 606, attribute weight options by which a user can adjust the weight of each individual visual attribute. Accordingly, the user can set $w_{sem}$, $w_{comp}$, and $w_{subi}$.

In some embodiments, the digital image matching system applies a weight of 0 to any visual attributes corresponding to unchecked visual attribute options 606. To illustrate from FIG. 6, the digital image matching system sets $w_{sem}=0$ and $w_{comp}=0$ because the only checked visual attribute option 606 is "Count."

As further mentioned, the digital image matching system can provide the similar digital images 604 based on similarity scores in relation to the query digital image 602. In particular, the digital image matching system can rank the digital images within a digital image database based on relevance to the query digital image 602. For example, the digital image matching system can rank similar digital image according to similarity scores (e.g., $S_{sem}$, $S_{comp}$, and/or $S_{subi}$) as compared to the query digital image 602, and can provide the similar digital images 604 for display within the user interface 600 according to their relative rankings.

While FIGS. 1-6 illustrate a particular layout and appearance of the various user interfaces (e.g., user interfaces 100, 300, and 600), in some embodiments the digital image matching system can provide a user interface having a different appearance and including different (e.g., additional or alternative) elements to those illustrated in FIGS. 1-6. For instance, the user interface 600 can have a different arrangement where the visual attribute options 606 are located in a different place within the user interface 600, and where the invert mask options and the clear mask option are, for instance, within a dropdown menu or toolbar associated with creating image masks. Additional or alternative arrangements are also possible.

As mentioned, the digital image matching system utilizes a deep neural network-based model to generate deep neural network-based representations for identifying similar digital images. In some embodiments, the digital image matching system further trains the deep neural network-based model. Indeed, FIG. 7 illustrates training a deep neural network-based model in accordance with one or more embodiments.

Figure 7:
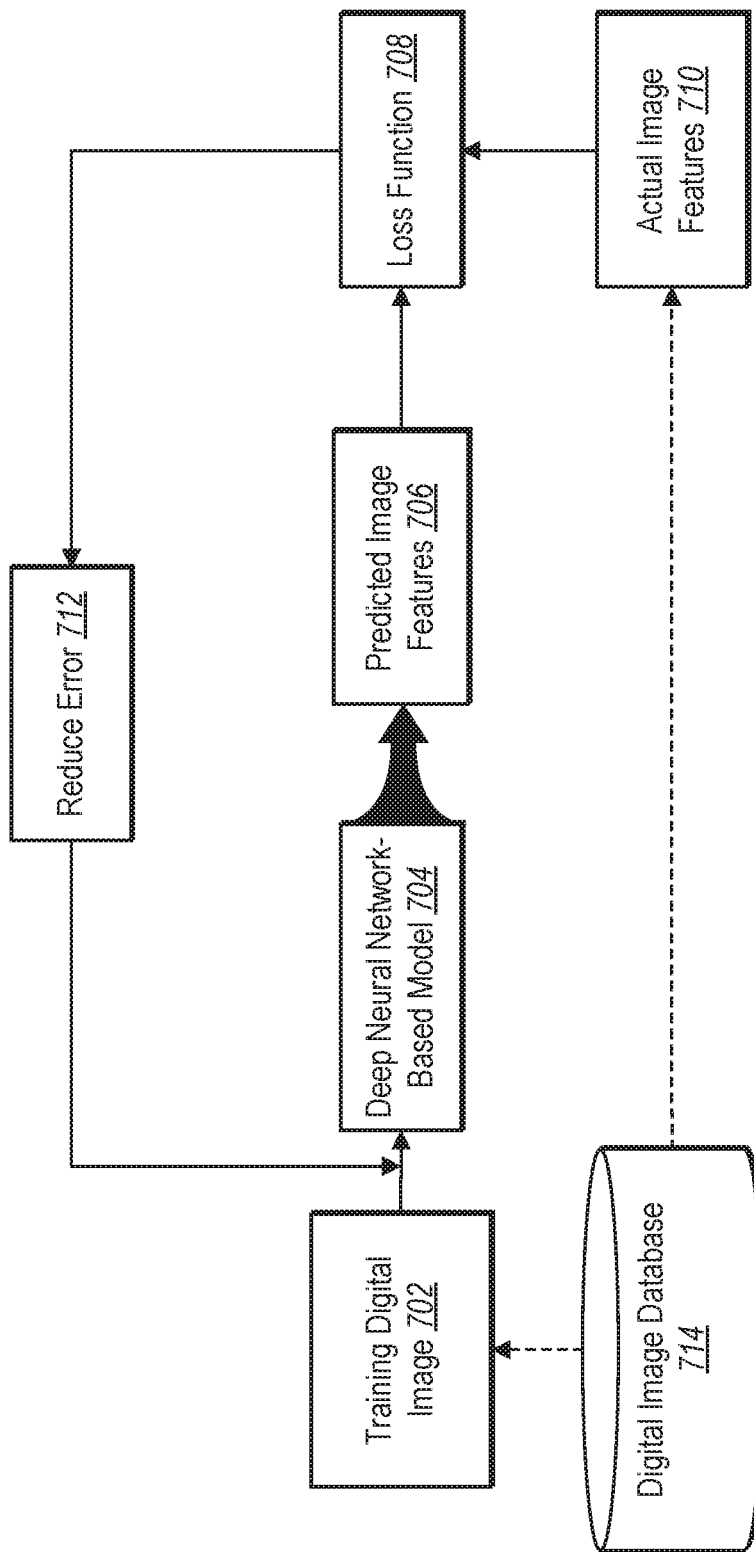
FIG. 7 illustrates training a deep neural network-based model in accordance with one or more embodiments.

As illustrated in FIG. 7, the digital image matching system trains the deep neural network-based model 704 based on training data included training digital images and image features. To train the deep neural network-based model 704, the digital image matching system accesses a digital image database 714 to identify a training digital image 702 to use as input to the deep neural network-based model 704. Based on the training digital image 702, the digital image matching system generates predicted image features 706. More specifically, as described above, the deep neural network-based model 704 generates a predicted deep neural network-based representation that corresponds to the training digital image 702.

In addition, the digital image matching system compares the predicted image features 706 with actual image features 710. To elaborate, the digital image matching system compares known deep features of a training digital image 702 with the predicted deep features for the same image. To compare the predicted image features 706 with the actual image features 710, the digital image matching system applies a loss function 708. Indeed, by applying a loss function, the digital image matching system determines an error or loss associated with the predicted image features 706. In addition, the digital image matching system performs an error reduction technique 712 to reduce the determined error or loss by modifying parameters of the deep neural network-based model 704.

As illustrated, the digital image matching system repeats the training process by accessing a second training digital image from the digital image database 714 and generating a corresponding set of predicted features to compare with actual features. By repeating the training process illustrated in FIG. 7 to constantly reduce the loss of the current prediction by adjusting network parameters, the digital image matching system increases the accuracy of the deep neural network-based model 704 to the point where, upon completing the training process, the deep neural network-based model 704 generates predicted image features that match (or are within an error threshold) of corresponding actual image features.

Figure 8:
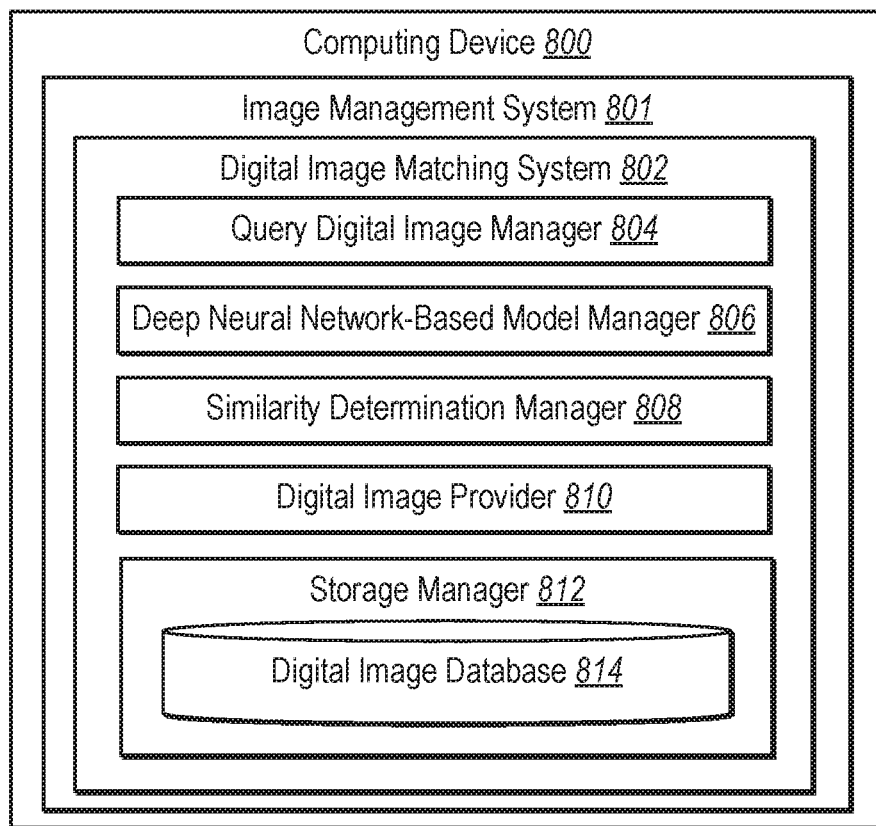
FIG. 8 illustrates a schematic diagram of a digital image matching system in accordance with one or more embodiments.

Looking now to FIG. 8, additional detail will be provided regarding components and capabilities of the digital image matching system. Specifically, FIG. 8 illustrates an example schematic diagram of a digital image matching system 802 within (e.g., as part of) an image management system 801 on an example computing device 800 (e.g., a user client device and/or server device). As shown in FIG. 8, the digital image matching system 802 may include a feature a query digital image manager 804, a deep neural network-based model manager 806, a similarity determination manager 808, a digital image provider 810, and a storage manager 812.

As mentioned, the digital image matching system 802 includes a query digital image manager 804. In particular, the query digital image manager 804 can communicate with a user client device to receive and/or detect a query digital image along with any user selections of visual attributes, weights, image masks, etc. For example, the query digital image manager 804 can receive a query digital image along with an image mask and can communicate with the deep neural network-based model manager 806 to provide an indication to use a deep neural network-based representation that corresponds with a user selection of visual attributes and that weights the image mask for the query digital image accordingly.

In addition, the digital image matching system 802 includes a deep neural network-based model manager 806. In particular the deep neural network-based model manager 806 can manage, analyze, or otherwise process query digital images to generate deep neural network-based representations of digital images. For example, the deep neural network-based model manager 806 can utilize a deep neural network-based model to generate sets of deep features and to further utilize one of the above-described algorithms (e.g., the selective similarity algorithm, the image composition algorithm, or the object count algorithm) to generate deep neural network-based representations. In addition, the deep neural network-based model manager 806 can communicate with the similarity determination manager 808 to provide information to the similarity determination manager pertaining to the image features.

As mentioned, the digital image matching system 802 includes a similarity determination manager 808. In particular, the similarity determination manager 808 can utilize a similarity search algorithm to search a digital image database and identify visually similar digital images for a query digital image. For example, the similarity determination manager 808 can communicate with the storage manager 812 to determine similarity scores for all (or a subset) of the digital images within the digital image database 814. In addition, the similarity determination manager 808 can rank the digital images within the digital image database 814 based on their respective similarity scores in relation to a particular query digital image. In some embodiments, the storage manager 812 can store a single digital image database 814 that contains deep features for candidate digital images, while in other embodiments the storage manager 812 can store multiple databases, including a database for multi-query feature information to match in multi-query scenarios.

As shown, the digital image matching system 802 further includes a digital image provider 810. In particular, the digital image provider 810 can communicate with the similarity determination manager 808 to provide, present, display, or otherwise transmit similar digital images to a user client device. For example, the digital image provider 810 may provide a number of top-ranked similar digital images (e.g., digital images that exceed a similarity threshold). In these or other embodiments, the digital image provider 810 provides the similar digital image for presentation by a user client device in order of their respective similarity scores (e.g., highest scores first).

In one or more embodiments, each of the components of the digital image matching system 802 are in communication with one another using any suitable communication technologies. Additionally, the components of the digital image matching system 802 can be in communication with one or more other devices including one or more of the user client devices describe below in relation to FIG. 9. It will be recognized that although the components of the digital image matching system 802 are shown to be separate in FIG. 8, any of the subcomponents may be combined into fewer components, such as into a single component, or divided into more components as may serve a particular implementation. Furthermore, although the components of FIG. 8 are described in connection with the digital image matching system 802, at least some of the components for performing operations in conjunction with the digital image matching system 802 described herein may be implemented on other devices within the environment.

The components of the digital image matching system 802 can include software, hardware, or both. For example, the components of the digital image matching system 802 can include one or more instructions stored on a computer-readable storage medium and executable by processors of one or more computing devices (e.g., the computing device 800). When executed by the one or more processors, the computer-executable instructions of the digital image matching system 802 can cause the computing device 800 to perform the patch matching methods described herein. Alternatively, the components of the digital image matching system 802 can comprise hardware, such as a special purpose processing device to perform a certain function or group of functions. Additionally or alternatively, the components of the digital image matching system 802 can include a combination of computer-executable instructions and hardware.

Furthermore, the components of the digital image matching system 802 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital image matching system 802 may be implemented as part of a stand-alone application on a personal computing device or a mobile device. Alternatively or additionally, the components of the digital image matching system 802 may be implemented in any application that allows creation and delivery of marketing content to users, including, but not limited to, applications in ADOBE CREATIVE CLOUD such as ADOBE PHOTOSHOP, ADOBE STOCK, ADOBE LIGHTROOM, ADOBE EXPERIENCE MANAGER, and ADOBE PREMIERE. "ADOBE," "PHOTO SHOP," "STOCK," "LIGHTROOM," "EXPERIENCE MANAGER," and "PREMIERE," are registered trademarks of Adobe Systems Incorporated in the United States and/or other countries.

Figure 9:
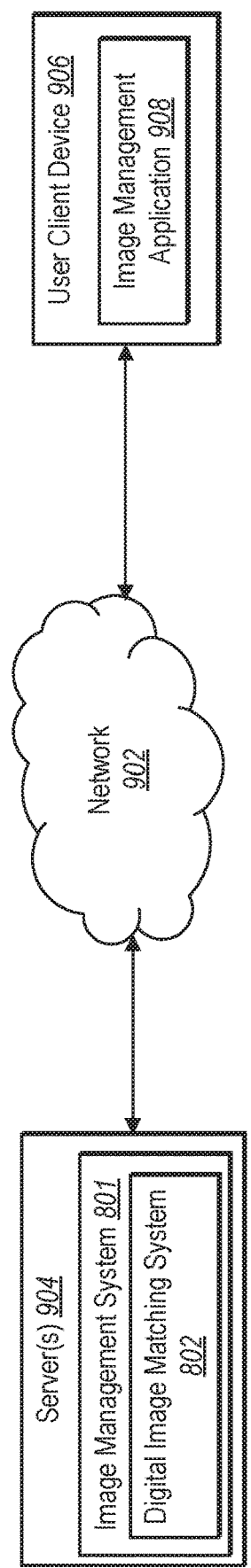
FIG. 9 illustrates an example environment for implementing a digital image matching system in accordance with one or more embodiments.

FIG. 9 illustrates a schematic diagram of one embodiment of an exemplary environment in which the digital image matching system 802 operates. In some embodiments, the exemplary environment includes a network 902, server(s) 904, and a user client device 906 including an image management application 908. While FIG. 9 illustrates a particular arrangement of the components of the environment, the environment may have additional or alternative arrangements.

As illustrated in FIG. 9, the environment may include a network 902. In particular, the network 902 can interface the server(s) 904 and the user client device 906. Accordingly, the network 902 can facilitate communications between the server(s) 904 and the user client device 906 via appropriate network protocol. For example, the network 902 may refer to a local network (e.g., a local area network or "LAN") or a wide area network ("WAN") or may refer to different communication protocol by which two computing devices can communicate.

As also illustrated in FIG. 9, the environment may include server(s) 904. The server(s) 904 may refer to at least one computing device (e.g., virtual reality or augmented reality devices) which can manage a deep neural network-based model to analyze digital images and identify similar digital images. In particular, the server(s) 904 can communicate, via network 902, with the image management application 908 on (e.g., housed within or installed on) the user client device 906. Accordingly, the server(s) 904 can communicate with the image management application 908 to enable a user to interact with a user interface provided by way of the image management application 908 to view, edit, select, or otherwise interact with query digital images and other user interface options such as visual attribute options and image masks.

In some embodiments, the digital image matching system 802 can be implemented as part of an image management system 801 on the user client device 906, and can therefore communicate with the user client device 906 directly. Accordingly, the digital image matching system 802 can enable a user to analyze a query digital image and identify similar digital images as part of a native application installed locally on the user client device 906 as either hardware, software, or both.

Although FIG. 9 illustrates a particular arrangement of the environment including the server(s) 904, the network 902, and the user client device 906, various additional or alternative arrangements are possible. For example, while FIG. 9 illustrates a single user client device 906 in communication with a network 902 and the server(s) 904, in some embodiments multiple user client devices may communicate directly with the server(s) 904, bypassing network 902.

To illustrate, the user client device 906 can communicate with the server(s) 904 to display video content provided by the server(s) 904. For example, the user client device 906 can display a user interface provided by the server(s) 904 that includes a query digital image, similar digital images, and/or other user interface options. The server(s) 904 utilize the digital image matching system 802 to analyze a query digital image to identify similar digital images in accordance with this disclosure. The server(s) 904 can communicate with the user client device 906 to render or otherwise display any changes or modifications made to the user interface.

FIGS. 1-9, the corresponding text, and the examples provide a number of different systems, methods, and non-transitory computer readable media for utilizing a deep neural network-based model to identify similar digital images based on various visual attributes. In addition to the foregoing, embodiments can also be described in terms of flowcharts comprising acts for accomplishing a particular result. For example, FIG. 10 illustrates a flowchart of an example sequence of acts in accordance with one or more embodiments.

Figure 10:
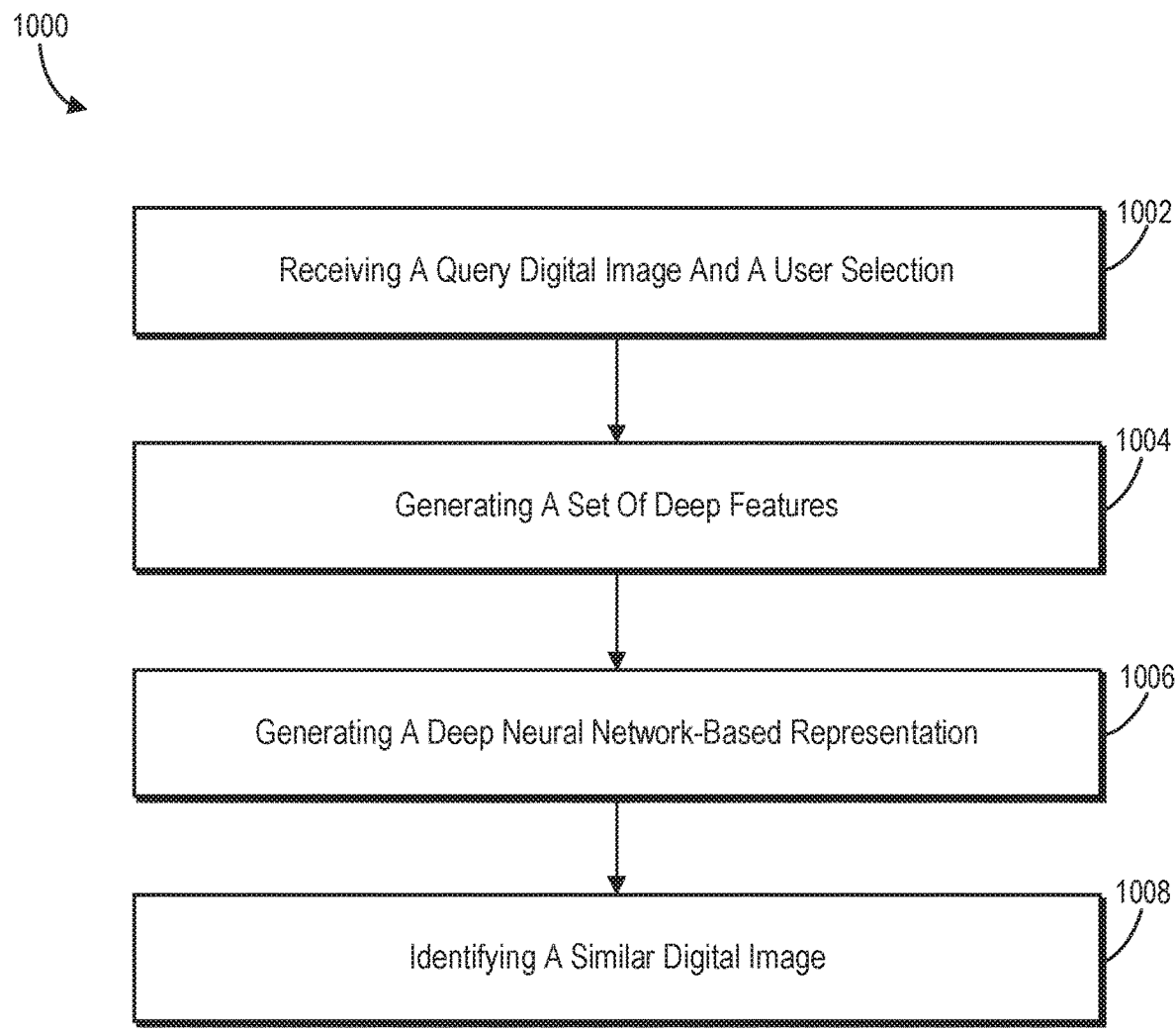
FIG. 10 illustrates a flowchart of a series of acts for identifying similar digital images for a query digital image in accordance with one or more embodiments.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 of utilizing a deep neural network-based model to identify similar digital images based on various visual attributes. In particular, the series of acts 1000 includes an act 1002 of receiving a query digital image and a user selection. For example, the act 1002 can involve receiving, from a user client device, a user selection of a query digital image and at least one of spatial selectivity, image composition, or object count to use to identify similar digital images. As mentioned, the digital image matching system can receive the query digital image input by a user by way of a user interface on a user client device.

In addition, the series of act 1000 can include an act 1004 of generating a set of deep features. In particular, the act 1004 can involve utilizing a deep neural network-based model to generate a set of deep features for the query digital image.

As shown, the series of acts 1000 can also include an act 1006 of generating a deep neural network-based representation. In particular, the act 1006 can involve generating, based on the set of deep features of the query digital image and in accordance with the user selection, a deep neural network-based representation of the query digital image by utilizing one or more of a spatial selectivity algorithm, an image composition algorithm, or an object count algorithm. The act 1006 can further involve modifying the set of deep features by utilizing a deep neural network-based representation comprising at least one of the spatial selectivity algorithm, the image composition algorithm, or the object count algorithm.

As further illustrated in FIG. 10, the series of acts 1000 can include an act 1008 of identifying a similar digital image. In particular, the act 1008 can involve, based on the deep neural network-based representation of the query digital image, identify, from a digital image database, a similar digital image for the query digital image.

Although not illustrated in FIG. 10, the series of acts 1000 can further include an act of training the deep neural network-based model to generate deep features for digital. The series of acts 1000 can still further include an act of receiving, from the user client device, an image mask that indicates a portion of the query digital image to emphasize in identifying similar digital images. In addition, the series of acts 1000 can include an act of generating, in response to receiving the image mask, the deep neural network-based representation based on weighting the portion of the query digital image indicated by the image mask. Weighting the portion of the query digital image indicated by the image mask can include applying weights to features of the set of features that correspond to the portion of the query digital image indicated by the image mask.

The series of acts 1000 can include acts of determining similarity scores for a plurality of digital images from the digital image database and ranking the plurality of digital images based on the determined similarity scores. Additionally, the series of acts can include acts of: receiving, from the user client device, a selection of a second query digital image; utilizing the deep neural network-based model to generate a second set of deep features for the second query digital image; generating, based on the second set of deep features of the second query digital image, a multi-query vector representation that represents a composite of the query digital image and the second query digital image; and identifying a similar digital image for the multi-query vector representation from within the digital image database.

Furthermore, the series of acts 1000 can include acts of receiving, in relation to the second query digital image, a second user selection of at least one of spatial selection, image composition, or object count, wherein the instructions cause the computer device to generate, based on the second user selection, the multi-query vector representation by utilizing at least one of the spatial selectivity algorithm, the image composition algorithm, or the object count algorithm. The series of acts 1000 can further include an act of receiving, from the user client device: an image mask that indicates a portion of the query digital image to emphasize in identifying similar digital images, and a second image mask that indicates a portion of the second query digital image to emphasize in identifying similar digital images.

Additionally, the series of acts 1000 can include an act of generating, in response to receiving the image mask and the second image mask, the multi-query vector representation to emphasize the portion of the query digital image indicated by the image mask and the portion of the second query digital image indicated by the second image mask. The series of acts 100 can still further include an act of comparing deep features of each of the plurality of digital images with deep features of the multi-query vector representation.

Furthermore, the series of acts 1000 can include an act of determining, based on the deep neural network-based representation of the query digital image, similarity scores for a plurality of digital images within a digital image database. Determining the similarity scores can include comparing deep features of each of the plurality of digital images with deep features of the query digital image. Thus, the series of acts 1000 can also include acts of: receiving, from the user client device, a selection of a second query digital image; utilizing the deep neural network-based model to generate a second set of deep features for the second query digital image; generating, based on the second set of deep features of the second query digital image, a multi-query vector representation that represents a composite of the query digital image and the second query digital image; determining, based on the deep neural network-based representation of the second query digital image, similarity scores for plurality of digital images within a multi-query digital image database; and identifying a similar digital image for the multi-query vector representation from within the digital image database.

Still further, the series of act 1000 can include acts of: receiving, from the user client device: an image mask that indicates a portion of the query digital image to emphasize in identifying similar digital images; a second image mask that indicates a portion of the second query digital image to further emphasize in identifying similar digital images; a first weight to apply to the query digital image; and a second weight to apply to the second query digital image; and modifying the multi-query vector representation to apply the first weight to the portion of the query digital image indicated by the image mask and the second weight to the portion of the second query digital image indicated by the second image mask.

Figure 11:
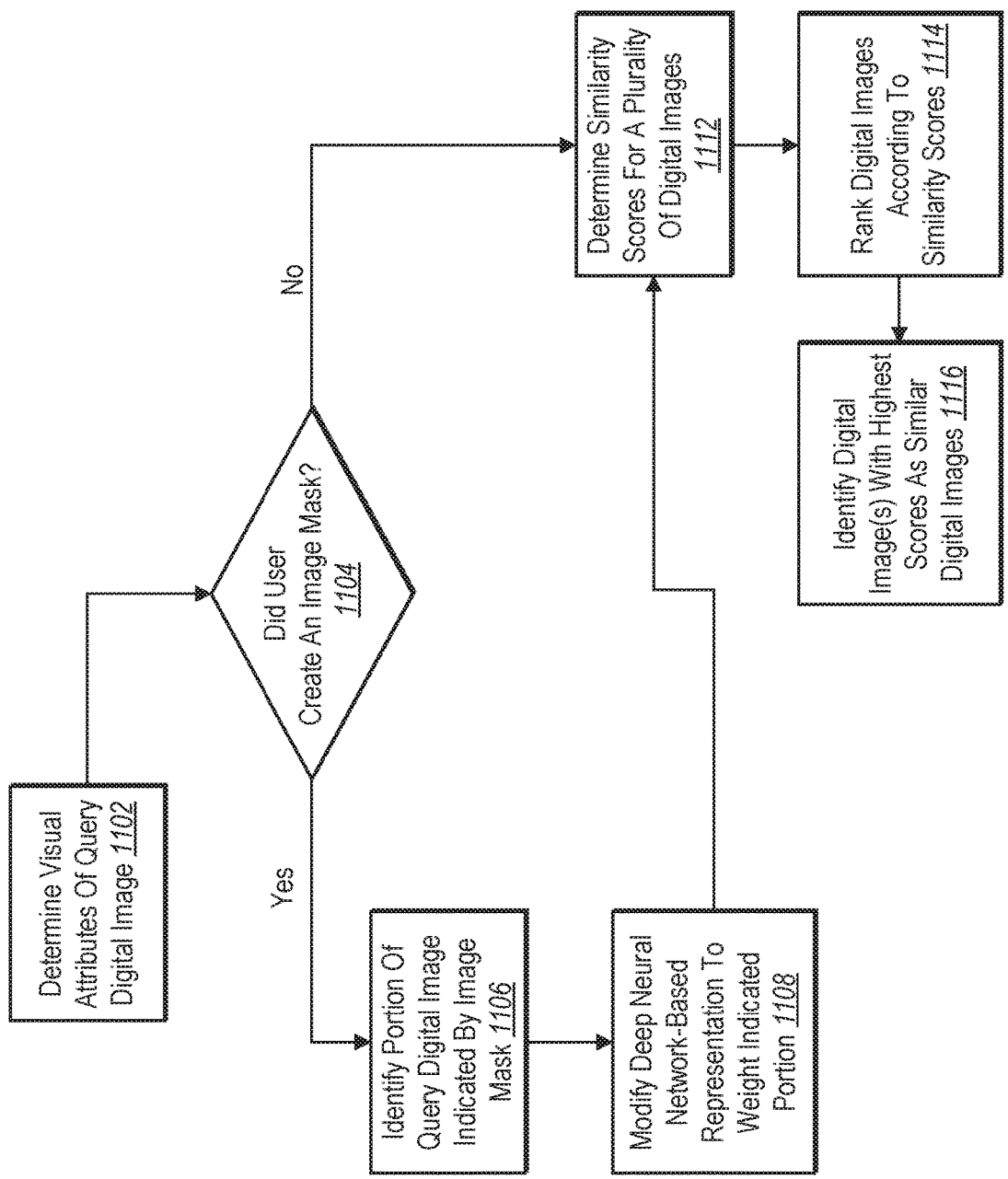
FIG. 11 illustrates a series of acts in a step for identifying similar digital images for a query digital image in accordance with one or more embodiments.

As mentioned above, the digital image matching system can utilize a deep neural network-based model to identify similar digital images. Indeed, FIG. 11 illustrates a step for identifying a similar digital image for a query digital image in accordance with one or more embodiment of the digital image matching system described herein. The step for determining depths of the feature points within the input video can include the below description of FIG. 11, in addition to relevant methods and techniques described elsewhere in this disclosure.

As illustrated in FIG. 11, the step for determining depths of the feature points within the input video can include acts 1102-1116. Indeed, the acts 1102-1116 can each indicate acts of utilizing a deep neural network-based model. In particular, the digital image matching system can perform act 1102 to determine visual attributes of a query digital image. Indeed, the act 1102 can include determining visual attributes such as semantic content, spatial selectivity, image composition, object count, color, etc., based on receiving user input as described herein.

As shown, the digital image matching system can further perform act 1104 to determine whether the user created an image mask. Indeed, the digital image matching system can whether or not the digital image matching system receives an image mask from a user client device.

Based on determining that the user did create an image mask, the digital image matching system performs act 1106 to identify a portion of the query digital image indicated by the image mask. In addition, the digital image matching system performs act 1108 to generate and/or modify a deep neural network-based representation (or to use a modified deep neural network-based representation) to weight the portion of the query digital image indicated by the image mask.

In addition, the digital image matching system performs act 1112 to determine similarity scores for a plurality of digital images. For example, the digital image matching system implements a similarity search function (e.g., F(•) as described above) to determine similarity scores for a plurality of digital images within a digital image database. The digital image matching system further performs act 1114 to rank the digital images according to their respective similarity scores, and performs act 1116 to identify digital images with the highest similarity scores as similar digital images.

Figure 12:
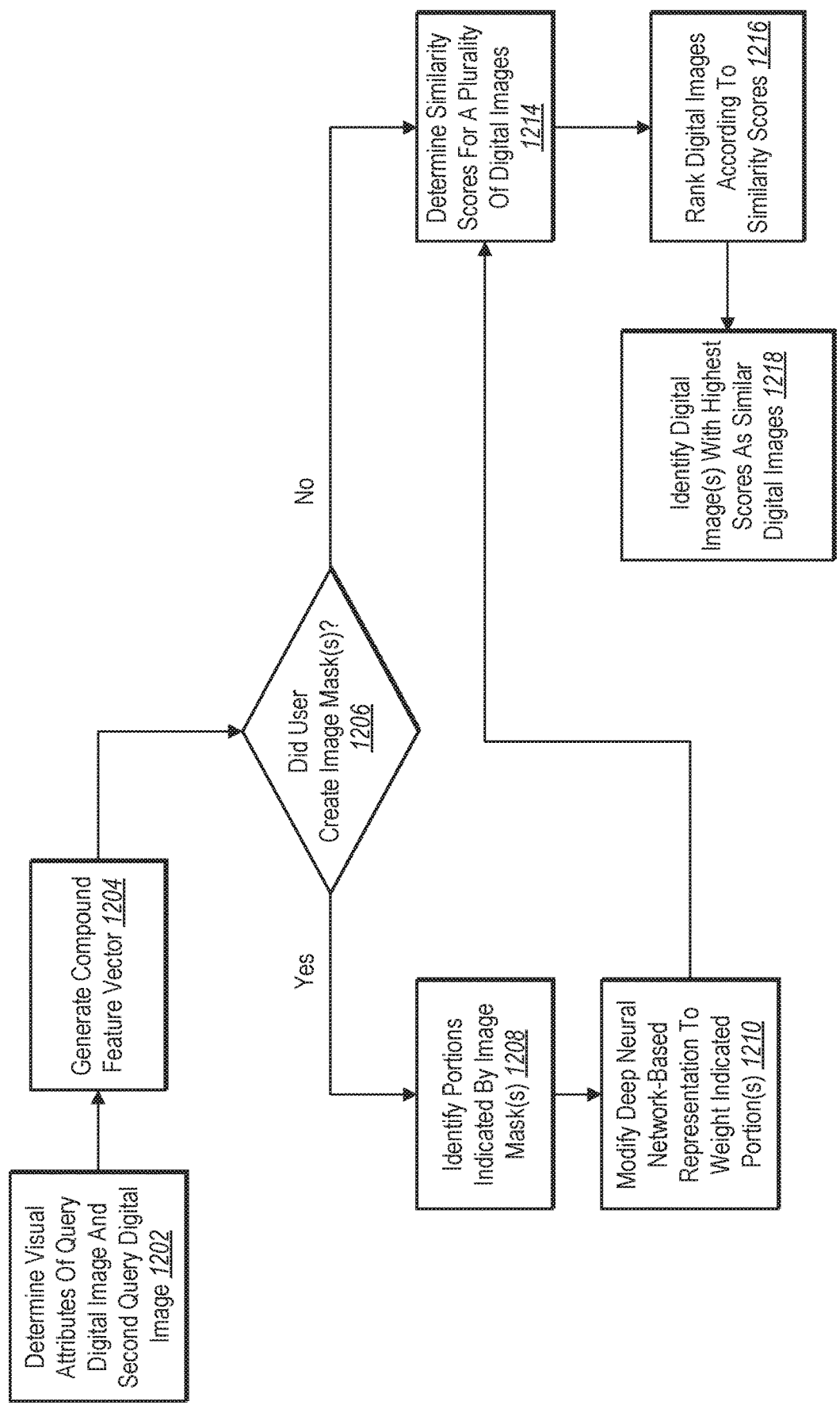
FIG. 12 illustrates a series of acts in a step for identifying a similar digital image for a compound feature vector in accordance with one or more embodiments.

As shown in FIG. 12, the digital image matching system can also perform a step for identifying a similar digital image for a compound feature vector. Indeed, the digital image matching system can perform acts 1202-1218 as part of (or separate from) utilizing a deep neural network-based model. For example, the digital image matching system can perform act 1202 to determine visual attributes of a query digital image and a second query digital image. Indeed, in response to receiving multiple query digital images, the digital image matching system can determine visual attributes of each query digital image.

The digital image matching system can further perform act 1204 to generate a compound feature vector. For example, the digital image matching system can aggregate features associated with each query digital image to generate a compound feature vector that represents a composite of the features of each query digital image in accordance with this disclosure. Similar to the above discussion in relation to FIG. 11, the digital image matching system can further perform act 1206 to determine whether the user created image masks. Indeed, the digital image matching system can receive more than one image mask, and can receive image masks for more than one query digital image.

As described above, in response to determining that the user did create at least one image mask, the digital image matching system can perform act 1208 to identify portions of the query digital image(s) indicated by the image masks, and can further perform act 1210 to generate and/or modify a deep neural network-based representation to weight the indicated portions of the query digital images.

Furthermore, the digital image matching system can perform act 1214 to determine similarity scores for a plurality of digital images. For instance, the digital image matching system can implement a similarity search function as described above. In addition, the digital image matching system can perform act 1216 to rank a plurality of digital images according to their respective similarity scores, and can perform act 1218 to identify those digital images with the highest similarity scores as similar digital images. In some embodiments, the digital image matching system can identify those digital images whose similarity score satisfies a similarity threshold as similar digital images.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
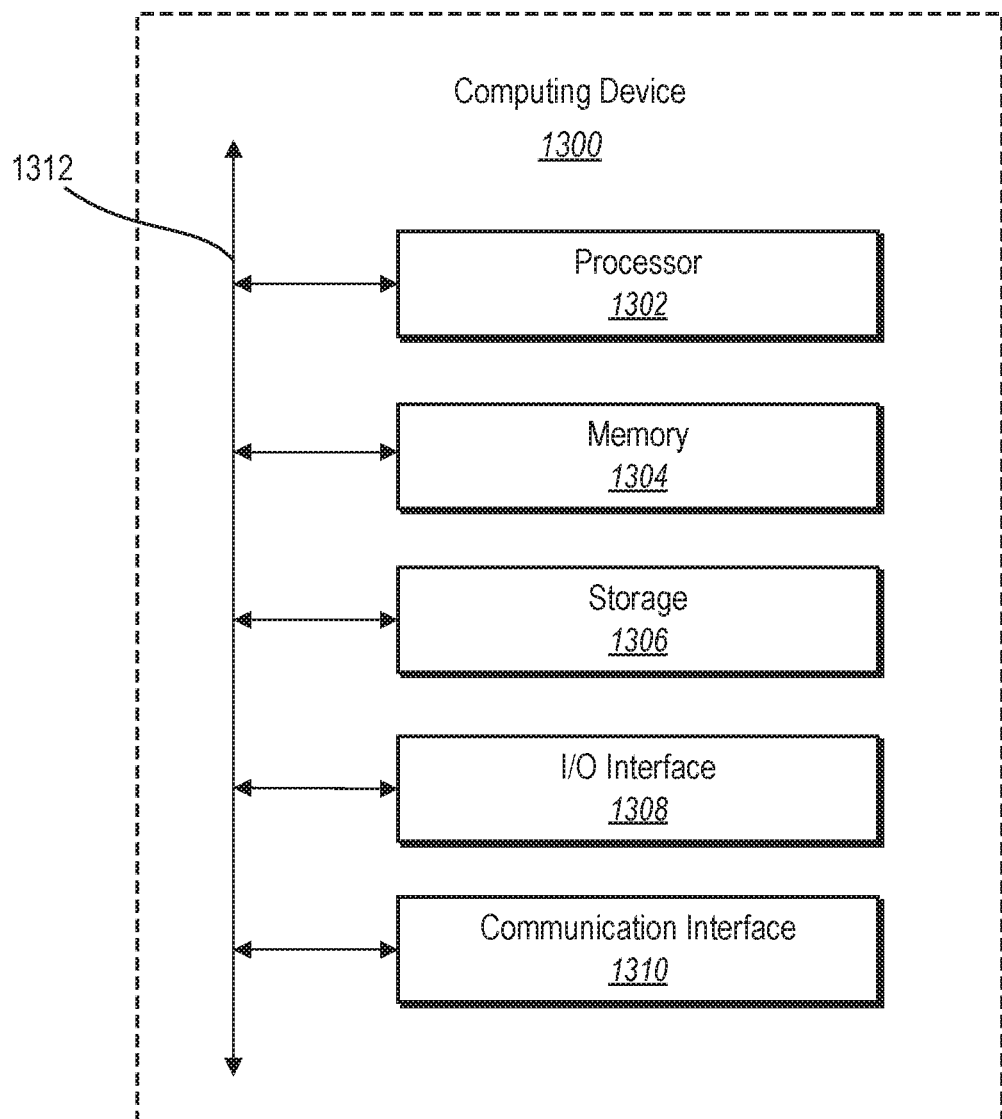
FIG. 13 illustrates a block diagram of an example computing device in accordance with one or more embodiments.

FIG. 13 illustrates, in block diagram form, an example computing device 1300 (e.g., computing device 800, client device 906, and/or server(s) 904) that may be configured to perform one or more of the processes described above. One will appreciate that the digital image matching system can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor 1302 includes hardware for executing instructions, such as those making up a computer program. As an example, and not by way of limitation, to execute instructions, processor 1302 may retrieve (or fetch) the instructions from an internal register, an internal cache, memory 1304, or a storage device 1306 and decode and execute them.

The computing device 1300 includes memory 1304, which is coupled to the processor 1302. The memory 1304 may be used for storing data, metadata, and programs for execution by the processor. The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 800 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for identifying digital images based on visual similarity comprising:
   receiving a search request comprising a query digital image and an indication of an area of the query digital image to emphasize;
   generating a deep neural network-based representation of the query digital image that applies a first weight to deep features corresponding to the area of the query digital image to emphasize and applies a second weight to deep features corresponding to portions of the query digital image outside the area to emphasize, wherein the first weight is heavier than the second weight;
   identifying, from a digital image database and based on the deep neural network-based representation of the query digital image, one or more digital images similar to the query digital image and that emphasize the area of the query digital image; and
   providing, in response to the search request, the one or more digital images similar to the query digital image and that emphasize the area of the query digital image.

2. The computer-implemented method of claim 1, wherein receiving the indication of the area of the query digital image to emphasize comprises receiving an image mask that defines the area of the query digital image to emphasize.

3. The computer-implemented method of claim 1, wherein generating the deep neural network-based representation comprises:
   extracting deep features from the query digital image utilizing a neural network; and
   utilizing location-weighted global average pooling to combine the deep features extracted from the query digital image in a manner that weights the deep features corresponding to the area of the query digital image to emphasize with the first weight and that weights the deep features corresponding to the portions of the query digital image outside the area to emphasize with the second weight.

4. The computer-implemented method of claim 3, further comprising:
   receiving a selection of a composition similarity option;
   wherein generating the deep neural network-based representation of the query digital image comprises spatially pooling the deep features of query digital image; and
   wherein identifying the one or more digital images similar to the query digital image and that emphasize the area of the query digital image based on the deep neural network-based representation of the query digital image comprises identifying digital images having a composition similar to the query digital image.

5. The computer-implemented method of claim 3, further comprising:
   receiving a selection of an objects count option;
   wherein generating the deep neural network-based representation of the query digital image comprises utilizing a subitizing neural network to extract features from the query digital image with correspondence to object counts; and
   wherein identifying the one or more digital images similar to the query digital image and that emphasize the area of the query digital image comprises identifying digital images having a count of objects that matches a count of objects in the query digital image.

6. The computer-implemented method of claim 1, further comprising:
   receiving a revised search request comprising a second query digital image;
   extracting deep features from the second query digital image;
   generating a multi-query vector representation that represents a composite of the query digital image and the second query digital image by combining the deep features of the second query digital image and the deep neural network-based representation of the query digital image;
   identifying, from the digital image database, one or more additional digital images similar to the query digital image and the second query digital image that emphasize the area of the query digital image based on the multi-query vector representation; and
   provide, in response to the revised search request, the one or more additional digital images similar to the query digital image and the second query digital image that emphasize the area of the query digital image.

7. The computer-implemented method of claim 6, further comprising:
   receiving an indication of an area of the second query digital image to emphasize;
   generating a deep neural network-based representation of the second query digital image by weighting deep features corresponding to the area of the second query digital image to emphasize utilizing a third weight and weighting deep features corresponding to portions of the second query digital image outside of the area of the second query digital image to emphasize utilizing a fourth weight, wherein the third weight is heavier than the fourth weight;
   generating the multi-query vector representation by combining the deep neural network-based representation of the query digital image and the deep neural network-based representation of the second query digital image;
   identifying, from the digital image database, at least one digital image similar to the query digital image and the second query digital image that emphasizes the area of the query digital image and the area of the second query digital image; and
   provide, in response receiving the indication of the area of the second query digital image, the at least one digital image similar to the query digital image and the second query digital image that emphasizes the area of the query digital image and the area of the second query digital image.

8. A non-transitory computer readable medium comprising instructions that, when executed by a processor, cause a computer device to:
   receive a search request comprising a query digital image and an indication of an area of the query digital image to emphasize in a search;
   generate a set of deep features for the query digital image utilizing a neural network;
   generate a deep neural network-based representation of the query digital image by:

weighting deep features from the set of deep features of the query digital image based corresponding to the area of the query digital image to emphasize utilizing a first weight; and weighting deep features from the set of deep features of the query digital image corresponding to portions of the query digital image outside the area to emphasize utilizing a second weight, wherein the first weight is heavier than the second weight;

identify, from a digital image database, one or more digital images similar to the query digital image that emphasize the area of the query digital image based on the deep neural network-based representation of the query digital image; and provide, in response to the search request, the one or more digital images similar to the query digital image that emphasize the area of the query digital image.

9. The non-transitory computer readable medium of claim 8, further comprising instructions that, when executed by the processor, cause the computer device to receive the indication of the area of the query digital image to emphasize in the search by receiving an image mask that defines the area of the query digital image to emphasize.

10. The non-transitory computer readable medium of claim 8, wherein the instructions, when executed by the processor, cause the computer device to generate the deep neural network-based representation utilizing location-weighted global average pooling to combine the deep features in a manner that weights the area of the query digital image to emphasize with the first weight and that weights the deep features corresponding to the portions of the query digital image outside the area to emphasize with the second weight.

11. The non-transitory computer readable medium of claim 8, further comprising instructions that, when executed by the processor, cause the computer device to identify the one or more digital images similar to the query digital image that emphasize the area of the query digital image by:

generating deep neural network-based representations for a plurality of digital images from the digital image database;

determining similarity scores for the plurality of digital images by determining a distance between the deep neural network-based representation of the query digital image and the deep neural network-based representations of the plurality of digital images;

ranking the plurality of digital images based on the determined similarity scores; and identifying the one or more digital images similar to the query digital image as a number of the plurality of the digital images having top-rankings.

12. The non-transitory computer readable medium of claim 8, further comprising instructions that, when executed by the processor, cause the computer device to:

receive a selection of a second query digital image;

generate a second set of deep features for the second query digital image utilizing the neural network;

generate, based on the second set of deep features of the second query digital image and the deep neural network-based representation of the query digital image, a multi-query vector representation that represents a composite of the query digital image and the second query digital image; and wherein the instructions, when executed by the processor, cause the computer device to identify, from the digital image database, one or more digital images similar to the query digital image that emphasize the area of the query digital image based on the multi-query vector representation.

13. The non-transitory computer readable medium of claim 12, further comprising instructions that, when executed by the processor, cause the computer device to:

receive an indication of an area of the second query digital image to emphasize;

generate a deep neural network-based representation of the second query digital image by weighting deep features corresponding to the area of the second query digital image to emphasize utilizing a third weight and weighting deep features corresponding to portions of the second query digital image outside of the area of the second query digital image to emphasize utilizing a fourth weight, wherein the third weight is heavier than the fourth weight; and wherein the instructions cause the computer device to generate the multi-query vector representation by combining the deep neural network-based representation of the query digital image and the deep neural network-based representation of the second query digital image.

14. The non-transitory computer readable medium of claim 13, wherein the instructions cause the computer device to generate the multi-query vector representation by:

normalizing the deep features of the deep neural network-based representation of the query digital image;

normalizing the deep features of the deep neural network-based representation of the second query digital image; and pooling the normalized deep features of the deep neural network-based representations of the query digital image and the second query digital image.

15. The non-transitory computer readable medium of claim 13, further comprising instructions that, when executed by the processor, cause the computer device to:

receive user input to increase a weight of the query digital image relative to the second query digital image; and weight the deep features of the deep neural network-based representation of the query digital image relative to the deep features of the deep neural network-based representation of the second query digital image when generating the multi-query vector representation.

16. A system for matching digital images based on visual similarity comprising:

at least one server configured to cause the system to:

receive, from a user client device, a search request for digital images having a composition similarity to a query digital image;

extract deep features from the query digital image utilizing a neural network;

generate a deep neural network-based representation of the query digital image that encodes the composition of the query digital image by spatially pooling the deep features from the query digital image;

identify, from a digital image database, one or more digital images similar that are visually similar to the query digital image and have a similar composition to the query digital image based on the deep neural network-based representation of the query digital image; and provide, in response to the search request, the one or more digital images visually similar to the query digital image and have a similar composition to the query digital image.

17. The system of claim 16, wherein the at least one server is further configured to:
- receive a selection of an objects count option;
- extract the deep features from the query digital image utilizing a subitizing neural network that extracts features with correspondence to object counts; and
- identify, from the digital image database, the one or more digital images that are visually similar to the query digital image by identifying digital images having a count of objects that matches a count of objects in the query digital image.

18. The system of claim 16, wherein the at least one server is further configured to:
- receive an indication of an area of the query digital image to emphasize;
- generate the deep neural network-based representation of the query digital image by weighting deep features corresponding to the area of the query digital image to emphasize; and
- identify, from the digital image database, the one or more digital images that are visually similar to the query digital image by identifying digital images that include content similar to content of the area of the query digital image to emphasize.

19. The system of claim 18, wherein the at least one server is configured to receive the indication of the area of the query digital image to emphasize by receiving an image mask that defines the area of the query digital image to emphasize.

20. The system of claim 16, wherein the at least one server is further configured to generate the deep neural network-based representation utilizing location-weighted pooling to combine the deep features extracted from the query digital image in a manner that weights the deep features corresponding to an area of the query digital image to emphasize.

* * * * *